United States Patent
Arvidson et al.

(10) Patent No.: US 11,046,047 B2
(45) Date of Patent: *Jun. 29, 2021

(54) WATER REPELLENT COMPOSITE LAMINATE FABRICS

(71) Applicant: HONEYWELL INTERNATIONAL INC., Morris Plains, NJ (US)

(72) Inventors: Brian Duane Arvidson, Chester, VA (US); Henry Gerard Ardiff, Chesterfield, VA (US); Brian Waring, Chester, VA (US); Lori L. Wagner, Richmond, VA (US); Gregory A. Davis, Midlothian, VA (US)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 337 days.

This patent is subject to a terminal disclaimer.

(21) Appl. No.: 15/834,638

(22) Filed: Dec. 7, 2017

(65) Prior Publication Data

US 2018/0200987 A1    Jul. 19, 2018

Related U.S. Application Data

(60) Provisional application No. 62/446,500, filed on Jan. 15, 2017.

(51) Int. Cl.
*B32B 7/02*       (2019.01)
*B32B 3/26*       (2006.01)
(Continued)

(52) U.S. Cl.
CPC .............. *B32B 7/02* (2013.01); *A41D 31/245* (2019.02); *B32B 3/266* (2013.01); *B32B 5/024* (2013.01);
(Continued)

(58) Field of Classification Search
CPC . F41H 3/02; F41H 1/02; F41H 5/0485; F41H 5/0478; F41H 5/0471; B32B 7/12;
(Continued)

(56) References Cited

U.S. PATENT DOCUMENTS 4,812,140 A    3/1989  Russell et al.
5,244,716 A *  9/1993  Thornton .................. B32B 5/18
                                               428/198

(Continued)

FOREIGN PATENT DOCUMENTS

CN     101687346 A    5/2005
EP         962313      8/2006
(Continued)

OTHER PUBLICATIONS

"MARPAT Arid Camo", 2019, Schemecolor, https://www.schemecolor.com/arid-camo-marpat-color-scheme.php (Year: 2019).*

(Continued)

*Primary Examiner* — Jasper Saberi
(74) *Attorney, Agent, or Firm* — Roberts & Roberts, LLP; Richard S. Roberts, Jr.

(57) ABSTRACT

Multilayer composite materials combining a low tenacity nylon fabric with a fabric formed from high tenacity fibers. The fabrics are bonded with a compatibilizing adhesive system that achieves a peel strength of at least 1.5 lbs/inch. The nylon is colored with a camouflage pattern and the high strength fabric is colored with a color that does not stand out relative to the camouflage pattern. The composite materials are used for forming vest covers and plate carrier materials, particularly webless plate carrier materials having slots for hanging modular accessories.

15 Claims, 4 Drawing Sheets

(51) Int. Cl.
*B32B 5/02* (2006.01)
*B32B 27/08* (2006.01)
*B32B 27/34* (2006.01)
*B32B 27/32* (2006.01)
*B32B 27/12* (2006.01)
*F41H 3/02* (2006.01)
*B32B 7/12* (2006.01)
*F41H 5/04* (2006.01)
*A41D 31/24* (2019.01)
*F41H 1/02* (2006.01)
*B32B 5/26* (2006.01)

(52) U.S. Cl.
CPC ............... *B32B 5/26* (2013.01); *B32B 7/12* (2013.01); *B32B 27/08* (2013.01); *B32B 27/12* (2013.01); *B32B 27/32* (2013.01); *B32B 27/34* (2013.01); *F41H 1/02* (2013.01); *F41H 3/02* (2013.01); *F41H 5/0471* (2013.01); *F41H 5/0478* (2013.01); *F41H 5/0485* (2013.01); *B32B 2255/02* (2013.01); *B32B 2260/046* (2013.01); *B32B 2305/188* (2013.01); *B32B 2307/73* (2013.01); *B32B 2323/04* (2013.01); *B32B 2377/00* (2013.01); *B32B 2571/02* (2013.01)

(58) Field of Classification Search
CPC .... B32B 2571/02; B32B 5/26; A41D 31/0061
See application file for complete search history.

(56) References Cited

U.S. PATENT DOCUMENTS

| | | | |
|---|---|---|---|
| 6,794,317 | B2 | 9/2004 | Elkouh et al. |
| 7,425,359 | B2 | 9/2008 | Zafiroglu |
| 7,571,493 | B1 | 8/2009 | Purvis et al. |
| 8,236,714 | B2 | 8/2012 | Frankel |
| 8,656,822 | B1* | 2/2014 | Saucedo ............ F41H 7/042 89/36.01 |
| 2005/0069716 | A1 | 3/2005 | Sasongko et al. |
| 2005/0186376 | A1* | 8/2005 | Rhee ................ B32B 27/08 428/36.9 |
| 2005/0255776 | A1* | 11/2005 | Howland ............ B32B 5/26 442/286 |
| 2007/0079416 | A1* | 4/2007 | Carlson ............ A41D 13/0012 2/2.5 |
| 2008/0196826 | A1 | 8/2008 | Polegato Moretti |
| 2008/0237911 | A1 | 10/2008 | Ardiff et al. |
| 2008/0241494 | A1* | 10/2008 | Ardiff ............... F41H 5/0478 428/219 |
| 2009/0324949 | A1* | 12/2009 | Nguyen ............. D06P 3/79 428/373 |
| 2013/0115393 | A1 | 5/2013 | Beck |
| 2013/0115839 | A1* | 5/2013 | Arvidson ............ B32B 5/12 442/135 |
| 2013/0143460 | A1 | 6/2013 | Beck |
| 2014/0242355 | A1* | 8/2014 | Castille ............. F41H 3/02 428/196 |
| 2016/0312399 | A1 | 10/2016 | Wagner et al. |
| 2017/0305109 | A1* | 10/2017 | Nathaniel ............ B32B 5/02 |

FOREIGN PATENT DOCUMENTS

| | | |
|---|---|---|
| JP | 2008209069 | 9/2008 |
| JP | 2016013669 | 1/2016 |
| WO | 2012177227 | 12/2012 |
| WO | 2016113637 | 7/2016 |

OTHER PUBLICATIONS

"MARPAT Color Scheme", 2019, Schemecolor, https://www.schemecolor.com/US-marine-camouflage-pattern-marpat-colors.php (Year: 2019).*

Macosko et al, "Block Copolymers and Compatibilization: Reactively Formed", 2001, Encyclopedia of Materials: Science and Technology, pp. 683-688 (Year: 2001).*

International Search Report and Written Opinion for International Application No. PCT/US2018/012884.

* cited by examiner

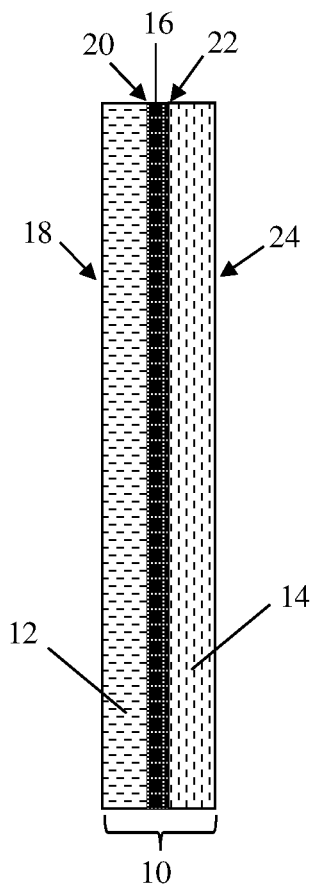
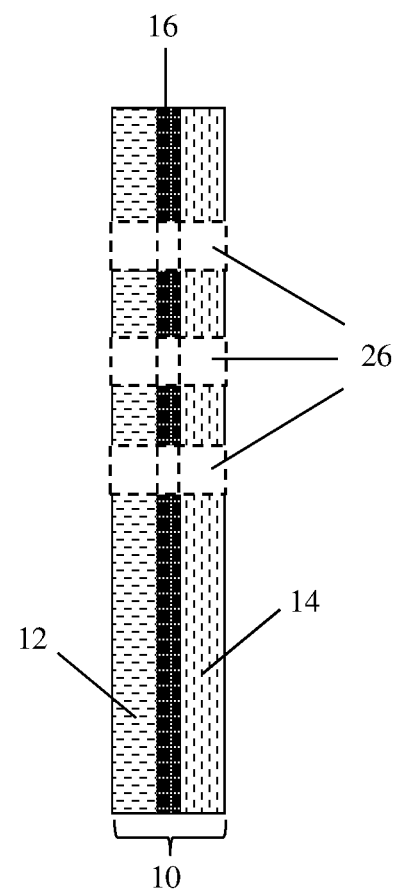
FIG. 1
FIG. 2

WATER REPELLENT COMPOSITE LAMINATE FABRICS

CROSS-REFERENCE TO RELATED APPLICATION

This application claims the benefit of co-pending U.S. Provisional Application Ser. No. 62/446,500, filed on Jan. 15, 2017, the disclosure of which is incorporated by reference herein in its entirety.

BACKGROUND

Technical Field

The disclosure relates to high strength, water repellent fibrous composites.

Description of the Related Art

High tensile strength synthetic fibers have long been used in applications where high strength to weight performance is important. For example, fibers such as SPECTRA® ultra-high molecular weight polyethylene fibers, commercially available from Honeywell International Inc., or para-aramid fibers, such as KEVLAR® fibers from E. I. du Pont de Nemours and Company of Wilmington, Del., are widely used in the armor industry where exceptional impact and penetration resistance at low weights is critically important. However, fabrics formed from such high tenacity fibers are generally stiffer and less flexible than fabrics formed from other fiber types, which is undesirable particularly for the fabrication of wearable textiles.

Other types of synthetic fibers that are strong but have lower tensile strengths, such as meta-aramid, nylon and polyester fibers, are more flexible and are useful in the manufacture of textile fabric articles for many industries, particularly in applications where durability is important. Such uses include automotive safety applications such as safety belts and air bags; geotextile applications such as drainage and erosion control materials; and sewing thread applications in articles such as safety clothing, sports apparel, outdoor wear such as raincoats and wind breakers, sailcloths, canopies, upholstery, curtains, tents, parachutes and tarps, etc.

While textiles formed from low tenacity fibers, such as those described above, are useful for some applications, their range of utility is nevertheless limited by their lack of high tensile strength. Therefore, in order to improve fabric strength for some types of approaches, it has been known to form hybrid composite articles combining both low and high tensile strength fabrics into a single article. In some applications, it is acceptable to mechanically attach these different fabric types to each other, such as by stitching or bolting. In other applications, mechanical attachment is unacceptable and adhesive attachment is necessary. However, in the textile arts, it is known that a particular fiber type will have a greater natural affinity for an adhesive that is chemically similar to the fiber type than for an adhesive that is chemically different than the fiber type. Therefore, when combining two dissimilar fabrics that are formed from different fiber types, bond strength is inherently weakened because a single, conventional intermediate adhesive will not bond strongly to both fabrics. This is of particular concern in embodiments where poor bonding of the fibrous layers to each other may lead to delamination within the composite material, thereby compromising the integrity of the material.

Additionally, in many textile fabric applications, it is known to apply chemical finishes to the fabrics, such as polymer coatings, to improve properties such as tear resistance, abrasion resistance, cut resistance and water resistance. For example, U.S. Pat. No. 4,493,870 teaches a flexible layered product for use in waterproof garments or tents of a polyethylene terephthalate or nylon textile material covered with a water resistant copolyether ester film. U.S. Pat. No. 4,847,142 teaches a water resistant, moisture permeable laminated article comprising a water resistant copolyether amide film attached to a woven nylon fabric. U.S. pre-grant publication 2004/0058603 teaches a laminated tarp material comprising a nylon fabric sandwiched between two layers of polymeric material comprising a vinyl copolymer and a polyurethane material. While the presence of these coatings may offer desirable advantages, they also are known to adversely affect the bond strength between discrete fabrics that are adhesively bonded together by conventional lamination or molding techniques.

Therefore, there is a need in the art for a solution where hybrid fibrous composites may be formed from chemically dissimilar fibrous materials, which may also have chemically finished surfaces, without sacrificing bond strength. This disclosure provides a solution to this need.

SUMMARY OF THE DISCLOSURE

This disclosure provides multilayer composite materials that are particularly well suited for the fabrication of armor plate carriers, as are commonly used by the military and law enforcement officers. In preferred embodiments, an outer fabric layer of military grade woven nylon (mil-spec nylon) is colored with a standard camouflage pattern that is externally visible. This outer nylon fabric is laminated to another woven fabric formed from high tenacity fibers (e.g., having a tenacity of greater than 10 g/denier), such as SPECTRA® fabric commercially available from Honeywell International Inc. of Morris Plains, N.J., with the two fabrics being adhered together by a unique adhesive system as described herein that achieves a strong bond between the fabrics, i.e., having a peel strength of at least 1.5 lbs/inch as determined by ASTM D1876. This composite material is particularly useful for the fabrication of a tactical vest or plate carrier having the design of the TAC PR™ Advanced Webless System from Safariland LLC of Jacksonville, Fla. as described in their U.S. Pat. No. 7,200,871, which teaches single fabric materials having a pattern of holes cut therethrough for attaching modular accessory packs, e.g., MOLLE (Modular Lightweight Load-Carrying Equipment) packs. In the multi-fabric composites of the disclosure, both outer fabric surfaces are colored so that should said holes sag or be pulled down under the weight of the modular attachments and cause exposure of the outermost surface of the base fabric, the camouflage appearance of the vest/plate carrier article will not be compromised.

More particularly, provided is a multilayer composite comprising:

a) an outer fibrous material layer having first and second surfaces, said outer fibrous material layer comprising one or more fibrous plies; each of said fibrous plies comprising a plurality of fibers; said first surface of the outer fibrous material having a colored appearance;

b) a fibrous base layer adjoined with the outer fibrous material layer, said fibrous base layer having first and second surfaces, wherein said first surface of the fibrous base layer is positioned facing said second surface of the outer fibrous material layer; said base layer comprising one or more fibrous plies, each of said fibrous plies comprising a plurality of fibers having a tenacity of greater than 10 g/denier; wherein at least some of the fibers of said outer fibrous material layer are chemically different than at least some of the fibers of said fibrous base layer; and wherein the second surface of the fibrous base layer has a colored appearance; and c) one or more intermediate layers between the outer fibrous material layer and the fibrous base layer, said intermediate layers comprising at least one of a compatibilizing adhesive scrim, a compatibilizing adhesive polymer layer, and a water repellent, wherein when multiple intermediate layers are present they are bonded together, wherein each of said outer fibrous material layer and said fibrous base layer is bonded to one of said intermediate layers, and wherein the composite has a peel strength between the outer fibrous material layer and the fibrous base layer of at least 1.5 lbs/inch.

Also provided is a multilayer composite comprising:

a) an outer fibrous material layer having first and second surfaces, said outer fibrous material layer comprising one or more fibrous plies; each of said fibrous plies comprising a plurality of fibers; said first surface of the outer fibrous material having a colored appearance;

b) a fibrous base layer adjoined with the outer fibrous material layer, said fibrous base layer having first and second surfaces, wherein said first surface of the fibrous base layer is positioned facing said second surface of the outer fibrous material layer; said base layer comprising one or more fibrous plies, each of said fibrous plies comprising a plurality of fibers having a tenacity of greater than 10 g/denier; wherein at least some of the fibers of said outer fibrous material layer are chemically different than at least some of the fibers of said fibrous base layer; and wherein the second surface of the fibrous base layer has a colored appearance; and c) one or more intermediate layers between the outer fibrous material layer and the fibrous base layer, said intermediate layers comprising at least one of a compatibilizing adhesive scrim, a compatibilizing adhesive polymer layer, and a water repellent, wherein when multiple intermediate layers are present they are bonded together, wherein each of said outer fibrous material layer and said fibrous base layer is bonded to one of said intermediate layers, and wherein the composite has a peel strength between the outer fibrous material layer and the fibrous base layer of at least 1.5 lbs/inch;

wherein a pattern of shaped openings are cut into and completely through the composite, whereby any exposure of the second surface of the fibrous base layer through said perforations is camouflaged by the colored appearance of the first surface of the outer fibrous material layer.

BRIEF DESCRIPTION OF THE DRAWINGS

FIG. 1 is a side view schematic representation of a composite including an outer fibrous material layer attached to a fibrous base layer by an intermediate compatibilizing adhesive/scrim layer.

FIG. 2 is a side view schematic representation of the composite illustrated in FIG. 1 having slots cut through the composite for hanging modular attachments.

DETAILED DESCRIPTION

Figure 3:
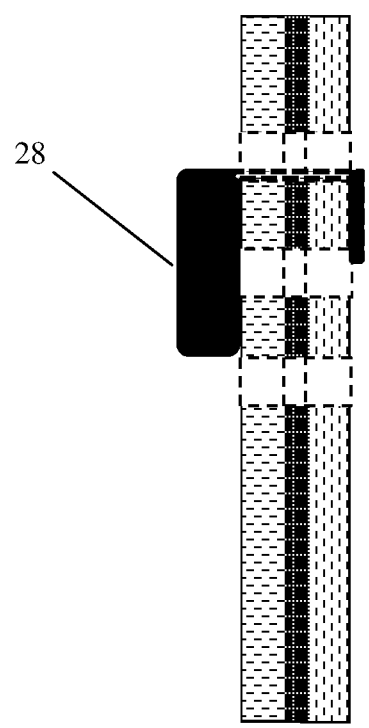
FIG. 3 is a side view schematic representation of the slotted composite of FIG. 2 showing a representation of a modular attachment hanging from a slot.

The composites provided herein include two different fibrous material layers, each layer comprising one or more fibrous plies. Each of the fibrous plies of each fibrous material layer comprises a plurality of fibers, each ply optionally having a polymeric binder material on the fibers. Most broadly, as illustrated in FIG. 1, a composite (10) of the disclosure comprises an outer fibrous material layer (12) (first fibrous material layer) having a first surface (18) and a second surface (20) and a fibrous base layer (14) (second fibrous material layer) having a first surface (22) and a second surface (24) that are adjoined and attached to each other such that the second surface (20) of the outer fibrous material layer (12) is facing and attached to the first surface (22) of the fibrous base layer (14) through one or more intermediate layers (16).

In each embodiment of the disclosure, each ply of the outer fibrous material layer (12) is preferably fabricated with only low tensile strength fibers, while each ply of the fibrous base layer (14) is preferably fabricated with only high tensile strength fibers. As used herein, a "fiber" is a long strand of a material, such as a strand of a polymeric material, the length dimension of which is much greater than the transverse dimensions of width and thickness. The fiber is preferably a long, continuous strand rather than a short segment of a strand referred to in the art as a "staple" or "staple fiber." A "strand" by its ordinary definition is a single, thin length of something, such as a thread or fiber. The cross-sections of fibers for use herein may vary widely, and they may be circular, flat or oblong in cross-section. They also may be of irregular or regular multi-lobal cross-section having one or more regular or irregular lobes projecting from the linear or longitudinal axis of the filament. Thus the term "fiber" includes filaments, ribbons, strips and the like having regular or irregular cross-section. A single fiber may be formed from just one filament or from multiple filaments. A fiber formed from just one filament is referred to herein as either a "single-filament" fiber or a "monofilament" fiber, and a fiber formed from a plurality of filaments is referred to herein as a "multifilament" fiber. Multifilament fibers as defined herein preferably include from 2 to about 3000 filaments, more preferably from 2 to 1000 filaments, still more preferably from 30 to 500 filaments, still more preferably from 40 to 500 filaments, still more preferably from about 40 filaments to about 240 filaments and most preferably from about 120 to about 240 filaments. Multifilament fibers are also often referred to in the art as fiber bundles or a bundle of filaments. As used herein, the term "yarn" is defined as a single strand consisting of multiple filaments and is used interchangeably with "multifilament fiber." The term "tenacity" refers to the tensile stress expressed as force (grams) per unit linear density (denier) of an unstressed specimen. The term "initial tensile modulus" refers to the ratio of the change in tenacity, expressed in grams-force per denier (g/d) to the change in strain, expressed as a fraction of the original fiber/tape length (in/in).

The term "denier" is a unit of linear density equal to the mass in grams per 9000 meters of fiber/yarn. In this regard, the fibers forming each layer may be of any suitable denier.

For example, fibers may have a denier of from about 50 to about 5000 denier, more preferably from about 200 to 5000 denier, still more preferably from about 300 to about 3000 denier, and most preferably from about 350 to about 1000 denier.

A fibrous material "layer" as used herein may comprise any type of uni-axial or multi-axial fabric, including a single-ply of unidirectionally oriented or randomly oriented (e.g., felted) non-woven fibers, a plurality of plies of non-woven fibers that have been consolidated into a single unitary structure, a single-ply of woven fabric, a plurality of woven fabric plies that have been consolidated into a single unitary structure, a single-ply of knitted fabric or a plurality of knitted fabric plies that have been consolidated into a single unitary structure. In this regard, a "layer" describes a generally planar arrangement having an outer front/top (first) planar surface and an outer back/bottom (second) planar surface. The term "fibrous ply" as used herein refers to a single array of unidirectionally oriented fibers, a single woven fabric, a single knitted fabric or a single felted fabric. Each fibrous ply will also have both a first surface and a second surface and a plurality of "fibrous plies" describes more than one ply of the fibrous structures. A "single-ply" of unidirectionally oriented fibers comprises an arrangement of fibers that are aligned in a unidirectional, substantially parallel array. This type of fiber arrangement is also known in the art as a "unitape", "unidirectional tape", "UD" or "UDT." As used herein, an "array" describes an orderly arrangement of fibers or yarns, which is exclusive of woven and knitted fabrics, and a "parallel array" describes an orderly, side-by-side, coplanar parallel arrangement of fibers or yarns. The term "oriented" as used in the context of "oriented fibers" refers to the alignment direction of the fibers rather than to stretching of the fibers. The term "fabric" describes fibrous structures that may include one or more fiber plies, with or without consolidation/molding of the plies. A non-woven fabric formed from unidirectional fibers typically comprises a plurality of non-woven fiber plies that are stacked on each other surface-to-surface in a substantially coextensive fashion and consolidated. When used herein, a "single-layer" structure refers to any monolithic fibrous structure composed of one or more individual plies, wherein multiple plies have been merged by consolidation/molding techniques. The term "composite" refers to a combination of elements and may refer to combinations of fibers, combinations of fibrous plies, and combinations of fibrous layers, each optionally including a polymeric binder material.

As used herein, a "low tensile strength fiber" is one which has a tenacity of less than 10 g/denier. Each ply of the outer fibrous material layer (12) is formed from fibers having a lower tensile strength than the fibers forming each ply of the fibrous base layer (14). In preferred embodiments, each of the fibers forming each of the fibrous plies of the outer fibrous material layer are preferably fibers having a tenacity of less than 10 g/denier, more preferably from about 5 g/denier to about 10 g/denier, and most preferably have a tenacity of less than 7 g/denier, less than 6 g/denier or less than 5 g/denier. Higher or lower tenacity fibers are also useful in forming the outer fibrous material layer provided that their tenacities are lower than the fibers forming the fibrous base layer.

Suitable low tenacity fibers for forming the outer fibrous material layer within these tenacity ranges non-exclusively include nylon fibers, polyester fibers, polypropylene fibers, low tenacity polyolefin fibers, or a combination thereof. Of these fiber types, nylon fibers are most preferred. Fabrics formed from such fibers are widely commercially available. Particularly suitable for use herein are commercially available military grade nylon fabrics, also referred to in the art as mil-spec nylon fabrics. In this regard, military grade or "mil-spec" (military specification) nylon refers to fabrics that meet certain standards set by the U.S. military to be acceptable for sale to the U.S. government. Several different specifications of nylon webbing have been deemed acceptable for use by the U.S. government, including MIL-T-5038 fabric, MIL-W-4088 fabric, MIL-W-5625 fabric, MIL-W-17337 fabric, MIL-W-27065 fabric, MIL-W-43668 fabric, MIL-DTL-32439 fabric, A-A-55301 fabric, A-A-59403 fabric, A-A-549403a fabric, MIL-C-3953 fabric, MIL-C-7219 fabric, MIL-C-10799 fabric, MIL-C-12369 fabric, MIL-C-43128 fabric, MIL-C-43734 fabric, MIL-C-43734D-Class 3 fabric, MIL-C-43375 fabric and Forestry Service (5100-86) fabric, all of which are useful herein for forming the outer fibrous material layer (12). Each mil-spec sets forth specific requirements for when the materials may be used in a military garment application, such as a tactical vest/vest cover/plate carrier application as used herein, with requirements for properties such as yarn denier, fabric weave density and fabric areal density depending on the intended type of armor application. Some of them also specify a particular camouflage coloration that is deemed acceptable by the military. In preferred embodiments of the disclosure, the outer fibrous material layer comprises a commercially available nylon fabric that is compliant with the MIL-DTL-32439 specifications.

One conventionally known type of mil-spec nylon fabric that is particularly useful for forming the outer fibrous material layer is CORDURA® brand nylon fabric which is commercially available from Invista North America S.A R.L. of Wilmington, Del. (categorized at least under military specification MIL-W-43668/A-A-55301). As discussed in greater detail below, such commercially available woven nylon fabrics are sometimes coated with a water repellent resin on at least one its surfaces, such as a water repellent polyurethane, but this coating is optional and is usually noted in the associated mil-spec. Preferred nylon fabrics are available in a range of deniers and weights, ranging from low denier ripstop fabrics (approximately 30-100 denier) to high denier ballistic fabrics (approximately 400-1500 denier). Particularly preferred fibers for the outer fibrous material are nylon fibers having a denier of from 400 to 2000 denier, more preferably from about 500 to about 1500 denier, and most preferably from about 500 to about 1000 denier.

As used herein, "high tensile strength" fibers that are useful for forming the fibrous base layer (14) are those having a tenacity of at least 10 g/denier, an initial tensile modulus of at least about 150 g/denier or more, and an energy-to-break of at least about 8 J/g or more, each as measured by ASTM D2256. Preferred high tensile strength fibers have a tenacity of at least about 15 g/denier, more preferably at least about 20 g/denier, still more preferably at least about 27 g/denier, more preferably having a tenacity of from about 28 g/denier to about 60 g/denier, still more preferably from about 33 g/denier to about 60 g/denier, still more preferably 39 g/denier or more, still more preferably from at least 39 g/denier to about 60 g/denier, still more preferably 40 g/denier or more, still more preferably 43 g/denier or more, or at least 43.5 g/denier, still more preferably from about 45 g/denier to about 60 g/denier, still more preferably at least 45 g/denier, at least about 48 g/denier, at least about 50 g/denier, at least about 55 g/denier or at least about 60 g/denier.

In this regard, most or all of the fibers forming the fibrous base layer (14) have a substantially greater tenacity (e.g., preferably at least double) than most or all of the fibers forming the outer fibrous material layer (12). By "most or all" it is meant that more than 50% of the fibers forming the fibrous base layer have a tenacity that is greater than the tenacity of at least 50% of the fibers forming the outer fibrous material layer. Most preferably, all of the fibers of the fibrous base layer are fibers having a tenacity greater than all of the fibers of the outer fibrous material layer. In this regard, the fibers forming each of the outer fibrous material layer and the fibrous base layer are exclusive of any fibers or threads that may be employed to stitch or sew together any of the fibrous plies or sections.

Suitable high tenacity fibers for forming the fibrous plies of the fibrous base layer non-exclusively include polyolefin fibers, such as high molecular weight polyethylene fibers, particularly ultra-high molecular weight polyethylene (UHMW PE) fibers, and polypropylene fibers. Also suitable are aramid fibers, particularly para-aramid fibers, polyamide fibers, polyethylene terephthalate fibers, polyethylene naphthalate fibers, extended chain polyvinyl alcohol fibers, extended chain polyacrylonitrile fibers, polybenzoxazole (PBO) fibers, polybenzothiazole (PBT) fibers, liquid crystal copolyester fibers, rigid rod fibers such as M5® fibers, and glass fibers, including electric grade fiberglass (E-glass; low alkali borosilicate glass with good electrical properties), structural grade fiberglass (S-glass; a high strength magnesia-alumina-silicate) and resistance grade fiberglass (R-glass; a high strength alumino silicate glass without magnesium oxide or calcium oxide). Each of these fiber types is conventionally known in the art. Also suitable for producing polymeric fibers are copolymers, block polymers and blends of the above materials.

The most preferred high tenacity fiber types are polyethylene fibers (particularly extended chain polyethylene fibers), aramid fibers, PBO fibers, liquid crystal copolyester fibers, polypropylene fibers (particularly highly oriented extended chain polypropylene fibers), polyvinyl alcohol fibers, polyacrylonitrile fibers, glass fibers and rigid rod fibers, particularly M5® rigid rod fibers. Specifically most preferred are ultra-high molecular weight polyethylene fibers and para-aramid fibers.

In the case of polyethylene, preferred fibers are extended chain polyethylenes having molecular weights of at least 300,000, preferably at least one million and more preferably between two million and five million. Such extended chain polyethylene (ECPE) fibers may be grown in solution spinning processes such as described in U.S. Pat. Nos. 4,137,394 or 4,356,138, which are incorporated herein by reference, or may be spun from a solution to form a gel structure, such as described in U.S. Pat. Nos. 4,413,110; 4,536,536; 4,551,296; 4,663,101; 5,006,390; 5,032,338; 5,578,374; 5,736,244; 5,741,451; 5,958,582; 5,972,498; 6,448,359; 6,746,975; 6,969,553; 7,078,099; 7,344,668 and U.S. patent application publication 2007/0231572, all of which are incorporated herein by reference. Particularly preferred fiber types are any of the UHMW PE polyethylene fibers sold under the trademark SPECTRA® from Honeywell International Inc. SPECTRA® fibers are well known in the art. Other useful polyethylene fiber types also include and DYNEEMA® UHMW PE yarns commercially available from Royal DSM N.V. Corporation of Heerlen, The Netherlands.

Particularly preferred methods for forming UHMW PE fibers are processes that are capable of producing UHMW PE fibers having tenacities of at least 39 g/denier, most preferably where the fibers are multi-filament fibers. The most preferred processes include those described in commonly-owned U.S. Pat. Nos. 7,846,363; 8,361,366; 8,444,898; 8,747,715; as well as U.S. publication no. 2011-0269359, the disclosures of which are incorporated herein by reference to the extent consistent herewith. Such processes are called "gel spinning" or "solution spinning" processes, wherein a solution of ultra-high molecular weight polyethylene and a solvent is formed, followed by extruding the solution through a multi-orifice spinneret to form solution filaments, cooling the solution filaments into gel filaments, and extracting the solvent to form dry filaments. These dry filaments are grouped into bundles which are referred to in the art as either fibers or yarns. The fibers/yarns are then stretched (drawn) up to a maximum drawing capacity to increase their tenacity.

Preferred aramid (aromatic polyamide) fibers are well known and commercially available, and are described, for example, in U.S. Pat. No. 3,671,542. For example, useful aramid filaments are produced commercially by DuPont under the trademark of KEVLAR®. Also useful herein are poly(m-phenylene isophthalamide) fibers produced commercially by DuPont of Wilmington, Del. under the trademark NOMEX® and fibers produced commercially by Teijin Aramid Gmbh of Germany under the trademark TWARON®; aramid fibers produced commercially by Kolon Industries, Inc. of Korea under the trademark HERACRON®; p-aramid fibers SVM™ and RUSAR™ which are produced commercially by Kamensk Volokno JSC of Russia and ARMOS™ p-aramid fibers produced commercially by JSC Chim Volokno of Russia.

Suitable PBO fibers are commercially available and are disclosed for example in U.S. Pat. Nos. 5,286,833, 5,296,185, 5,356,584, 5,534,205 and 6,040,050, each of which is incorporated herein by reference. Suitable liquid crystal copolyester fibers are commercially available and are disclosed, for example, in U.S. Pat. Nos. 3,975,487; 4,118,372 and 4,161,470, each of which is incorporated herein by reference, and including VECTRAN® liquid crystal copolyester fibers commercially available from Kuraray Co., Ltd. of Tokyo, Japan. Suitable polypropylene fibers include highly oriented extended chain polypropylene (ECPP) fibers as described in U.S. Pat. No. 4,413,110, which is incorporated herein by reference. Suitable polyvinyl alcohol (PV-OH) fibers are described, for example, in U.S. Pat. Nos. 4,440,711 and 4,599,267 which are incorporated herein by reference. Suitable polyacrylonitrile (PAN) fibers are disclosed, for example, in U.S. Pat. No. 4,535,027, which is incorporated herein by reference. Each of these fiber types is conventionally known and is widely commercially available. M5® fibers are formed from pyridobisimidazole-2,6-diyl(2,5-dihydroxy-p-phenylene) and were most recently manufactured by Magellan Systems International of Richmond, Va. and are described, for example, in U.S. Pat. Nos. 5,674,969, 5,939,553, 5,945,537, and 6,040,478, each of which is incorporated herein by reference. The term "rigid rod" fibers is not limited to such pyridobisimidazole-based fiber types, and many PBO and aramid fiber varieties are often referred to as rigid rod fibers. Commercially available glass fibers include S2-Glass® S-glass fibers commercially available from AGY of Aiken, S.C., HiPerTex™ E-Glass fibers, commercially available from 3B Fibreglass of Battice, Belgium, and VETROTEX® R-glass fibers from Saint-Gobain of Courbevoie, France.

Both the low tenacity fibers of the outer fibrous material layer and the high tenacity fibers of the fibrous base layer may be of any suitable denier. Preferred fiber deniers for the low tenacity fibers are from about 400 to about 2000 denier, more preferably from about 500 to about 1500 denier, and most preferably from about 500 to about 1000 denier. Nylon fibers having a denier of 500 or 1000 are particularly preferred low tenacity fibers. Preferred fiber deniers for the high tenacity fibers may be from about 50 to about 5000 denier, more preferably from about 200 to 5000 denier, still more preferably from about 300 to about 3000 denier, and most preferably from about 350 to about 1000 denier, with 375 denier and 400 denier UHMW polyethylene fibers or para-aramid fibers being most preferred high tenacity fibers.

As an alternative to conventional fibers, each of the plies forming the outer fibrous material layer (12) and each of the plies forming the fibrous base layer (14) may independently comprise fibrous tapes that are formed by compressing fibers as described in, for example, commonly-owned U.S. Pat. Nos. 8,263,119; 8,697,220; 8,685,519; 8,852,714; 8,906,485; 9,138,961 and 9,291,440, each of which is incorporated herein by reference to the extent consistent herewith. In this regard, the term "tape" refers to a flat, narrow, monolithic strip of material having a length greater than its width and an average cross-sectional aspect ratio, i.e. the ratio of the greatest to the smallest dimension of cross-sections averaged over the length of the tape article, of at least about 3:1. Like fibers, the tapes may be of any suitable denier, preferably having a denier of from about 50 to about 30,000, more preferably from about 200 to 10,000 denier, still more preferably from about 650 to about 2000 denier, and most preferably from about 800 to about 1500 denier. When the materials of the disclosure are formed from tapes rather than conventional fibers, the materials are still considered fibrous because the tapes themselves are fibrous.

Each of the fibrous materials of the disclosure may individually comprise any type of uni-axial or multi-axial fabric, including woven fabrics, non-woven fabrics formed from unidirectionally oriented fibers, non-woven felted fabrics formed from randomly oriented fibers, or knitted fabrics.

Woven fabrics may be formed using techniques that are well known in the art using any fabric weave, such as plain weave, crowfoot weave, basket weave, satin weave, twill weave, three dimensional woven fabrics, and any of their several variations. Plain weave is most common, where fibers are woven together in an orthogonal 0°/90° orientation with warp fibers oriented perpendicular to weft (fill) fibers, and is preferred.

Knit fabric structures are constructions composed of intermeshing loops, with the four major types being tricot, raschel, net and oriented structures. Due to the nature of the loop structure, knits of the first three categories are not as suitable as they do not take full advantage of the strength of a fiber. Oriented knitted structures, however, use straight inlaid yarns held in place by fine denier knitted stitches. The fibers are very straight without the crimp effect found in woven fabrics due to the interlacing effect on the yarns. These laid in yarns can be oriented in a monoaxial, biaxial or multi-axial direction depending on the engineered requirements. It is preferred that the specific knit equipment used in laying in the load bearing yarns is such that the yarns are not pierced through.

Non-woven unidirectional fibrous ply constructions are also conventional in the art and methods of their fabrication are also conventional. Such conventional methods may be employed to fabricate all or any of the fibrous plies of the disclosure that are desired to have a non-woven unidirectional construction. For example, in a preferred method of forming a non-woven unidirectional fibrous ply, a plurality of fibers are arranged into an array, typically being arranged as a fiber web comprising a plurality of fibers aligned in a substantially parallel, unidirectional array. In a typical process, fiber bundles are supplied from a creel and led through guides and one or more spreader bars into a collimating comb. This is typically followed by coating the fibers with a polymeric binder material. A typical fiber bundle will have from about 30 to about 2000 individual fibers. The spreader bars and collimating comb disperse and spread out the bundled fibers, reorganizing them side-by-side in a coplanar fashion. Ideal fiber spreading results in the individual filaments or individual fibers being positioned next to one another in a single fiber plane, forming a substantially unidirectional, parallel array of fibers without fibers overlapping each other.

Felts may also be formed by one of several techniques known in the art. A felt is a non-woven network of randomly oriented fibers, preferably at least one of which is a discontinuous fiber, preferably a staple fiber having a length ranging from about 0.25 inch (0.64 cm) to about 10 inches (25.4 cm). Conventional methods include carding, fluid laying, melt blowing and spin laying.

The outer fibrous material layer and the fibrous base layer may each may be the same or different in fabric structure (i.e., woven, non-woven or knit) relative to each other. Most preferably, all the fibrous plies of the outer fibrous material layer and all the plies of the fibrous base layer are woven fibrous plies, and in the most preferred embodiments the outer fibrous material layer and fibrous base layer each individually comprise, consist essentially of or consist of only one ply of woven fabric.

When weaving fabrics, the warp and weft (fill) fiber count, known in the art as a "pick count" or "mesh count," is a measure of the density of the woven fabric. Plain weave fabrics may have an equal or unequal warp and weft count. In this regard, a preferred woven outer fibrous material layer is one having a pick count of from about 20 ends per inch to about 80 ends per inch in each of the warp and weft directions, more preferably from about 25 ends per inch to about 70 ends per inch in each of the warp and weft directions, and most preferably from about 25 ends per inch to about 60 ends per inch in each of the warp and weft directions. A preferred woven fibrous base layer is one having a pick count of from about 15 ends per inch to about 70 ends per inch in each of the warp and weft directions, more preferably from about 20 ends per inch to about 60 ends per inch in each of the warp and weft directions, still more preferably from about 20 ends per inch to about 50 ends per inch in each of the warp and weft directions, and most preferably from about 25 ends per inch to about 40 ends per inch in each of the warp and weft directions. In the most preferred embodiments, the outer fibrous material layer (12) comprises one or more plies of a woven nylon fabric formed from nylon fibers having a denier of from about 500 to 1000 denier, each with a plain weave density of at least 26 fiber/yarn ends per inch×26 fiber/yarn ends per inch, and the fibrous base layer (14) preferably comprises one or more plies of a woven polyethylene fabric formed from high tenacity UHMW PE fibers having a denier of from about 200 to 500 denier, each with a plain weave density of at least 32 fiber/yarn ends per inch×32 fiber/yarn ends per inch.

The fibers (or tapes) forming each fibrous layer of the disclosure may optionally be at least partially coated with a polymeric binder material. The polymeric binder material is also commonly referred to in the art as a polymeric "matrix" material. These terms are conventionally known in the art and describe a material that binds fibers together, either by way of its inherent adhesive characteristics or after being subjected to well-known heat and/or pressure conditions. As used herein, a "polymeric" binder or matrix material includes resins and rubber. When present, the polymeric binder/matrix material either partially or substantially coats the individual filaments/fibers forming a fibrous layer, preferably substantially coating (greater than 90% surface area coverage) each of the individual filaments/fibers forming a fibrous ply or fibrous layer, or fully encapsulating each of the individual filaments/fibers forming a fibrous ply or fibrous layer. When the fibrous layers comprise tapes rather than uncompressed fibers, the binder may be used in lower quantities and substantial coating or encapsulation of the tapes is not necessary or preferred.

Suitable polymeric binder materials include both low tensile modulus, elastomeric materials and high tensile modulus materials. As used herein throughout, the term tensile modulus means the modulus of elasticity, which for polymeric binder materials is measured by ASTM D638. A low or high modulus binder may comprise a variety of polymeric and non-polymeric materials. For the purposes of this disclosure, a low modulus elastomeric material has a tensile modulus measured at about 6,000 psi (41.4 MPa) or less according to ASTM D638 testing procedures. A low modulus polymer is preferably an elastomer having a tensile modulus of about 4,000 psi (27.6 MPa) or less, more preferably about 2400 psi (16.5 MPa) or less, still more preferably 1200 psi (8.23 MPa) or less, and most preferably is about 500 psi (3.45 MPa) or less. The glass transition temperature (Tg) of the low modulus elastomeric material is preferably less than about 0° C., more preferably the less than about −40° C., and most preferably less than about −50° C. The low modulus elastomeric material also has a preferred elongation to break of at least about 50%, more preferably at least about 100% and most preferably at least about 300%. Whether a low modulus material or a high modulus material, in addition to the colorant, the polymeric binder may also include fillers such as carbon black or silica, may be extended with oils, or may be vulcanized by sulfur, peroxide, metal oxide or radiation cure systems as is well known in the art.

A wide variety of materials and formulations may be utilized as a low modulus polymeric binder. Representative examples include polyethylene, polybutadiene, polyisoprene, natural rubber, ethylene-propylene copolymers, ethylene-propylene-diene terpolymers, polysulfide polymers, polyurethane elastomers, chlorosulfonated polyethylene, polychloroprene, plasticized polyvinylchloride, butadiene acrylonitrile elastomers, poly(isobutylene-co-isoprene), polyacrylates, polyesters, polyethers, fluoroelastomers, silicone elastomers, copolymers of ethylene, polyamides (useful with some fiber types), acrylonitrile butadiene styrene, polycarbonates, and combinations thereof, as well as other low modulus polymers and copolymers curable below the melting point of the fiber. Also useful are blends of different elastomeric materials, or blends of elastomeric materials with one or more thermoplastics.

Particularly useful are block copolymers of conjugated dienes and vinyl aromatic monomers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type A-B-A, multi-block copolymers of the type $(AB)_n$ (n=2–10) or radial configuration copolymers of the type $R-(BA)_x$ (x=3–150); wherein A is a block from a polyvinyl aromatic monomer and B is a block from a conjugated diene elastomer. Many of these polymers are produced commercially by Kraton Polymers of Houston, Tex., including low modulus polystyrene-polyisoprene-polystyrene block copolymers sold under their trademark KRATON®. Also useful are resin dispersions of styrene-isoprene-styrene (SIS) block copolymer sold under the trademark PRINLIN® and commercially available from Henkel Technologies, based in Dusseldorf, Germany.

High modulus, rigid materials generally have an initial tensile modulus greater than 6,000 psi. Useful high modulus, rigid polymeric binder materials include polyurethanes (both ether and ester based), epoxies, polyacrylates, phenolic/polyvinyl butyral (PVB) polymers, vinyl ester polymers, styrene-butadiene block copolymers, as well as mixtures of polymers such as vinyl ester and diallyl phthalate or phenol formaldehyde and polyvinyl butyral. Also useful is a thermosetting polymer that is soluble in carbon-carbon saturated solvents such as methyl ethyl ketone, and possessing a high tensile modulus when cured of at least about $1 \times 10^6$ psi (6895 MPa) as measured by ASTM D638. Also useful are the binder materials described in U.S. Pat. No. 6,642,159, the disclosure of which is incorporated herein by reference.

Most specifically preferred binder polymers are polar resins or polar polymers, particularly polyurethanes within the range of both soft and rigid materials at a tensile modulus ranging from about 2,000 psi (13.79 MPa) to about 8,000 psi (55.16 MPa). Preferred polyurethanes are applied as aqueous polyurethane dispersions that are most preferably, but not necessarily, cosolvent free. Such includes aqueous anionic polyurethane dispersions, aqueous cationic polyurethane dispersions and aqueous nonionic polyurethane dispersions. Particularly preferred are aqueous anionic polyurethane dispersions; aqueous aliphatic polyurethane dispersions, and most preferred are aqueous anionic, aliphatic polyurethane dispersions, all of which are preferably cosolvent free dispersions. Such includes aqueous anionic polyester-based polyurethane dispersions; aqueous aliphatic polyester-based polyurethane dispersions; and aqueous anionic, aliphatic polyester-based polyurethane dispersions, all of which are preferably cosolvent free dispersions. Such also includes aqueous anionic polyether polyurethane dispersions; aqueous aliphatic polyether-based polyurethane dispersions; and aqueous anionic, aliphatic polyether-based polyurethane dispersions, all of which are preferably cosolvent free dispersions. Similarly preferred are all corresponding variations (polyester-based; aliphatic polyester-based; polyether-based; aliphatic polyether-based, etc.) of aqueous cationic and aqueous nonionic dispersions. Most preferred is an aliphatic polyurethane dispersion having a modulus at 100% elongation of about 700 psi or more, with a particularly preferred range of 700 psi to about 3000 psi. More preferred are aliphatic polyurethane dispersions having a modulus at 100% elongation of about 1000 psi or more, and still more preferably about 1100 psi or more. Most preferred is an aliphatic, polyether-based anionic polyurethane dispersion having a modulus of 1000 psi or more, preferably 1100 psi or more.

When a fibrous layer of the disclosure does include a binder, the total weight of the binder comprising the particular fibrous layer preferably comprises from about 2% to about 50% by weight, more preferably from about 5% to about 30%, more preferably from about 7% to about 20%, and most preferably from about 14% to about 20% by weight of the fibers plus the weight of the binder. A lower binder content is appropriate for woven and knitted fibrous layers, wherein a polymeric binder content of greater than zero but less than 10% by weight of the fibers plus the weight of the binder is typically most preferred, but this is not intended as strictly limiting. For example, phenolic/PVB impregnated woven aramid fabrics are sometimes fabricated with a higher resin content of from about 20% to about 30%, although about 12% content is typically preferred. In this regard, weaving or knitting of fabrics is typically performed prior to coating the fibers of a woven fabric with a polymeric binder, wherein the fabrics are thereafter impregnated with the binder.

Methods for applying a polymeric binder material to fibers to thereby form impregnated fibrous plies/layers are well known and readily determined by one skilled in the art. The term "impregnated" is considered herein as being synonymous with "embedded," "coated," or otherwise applied with a polymeric coating where the polymeric material diffuses into the fibrous ply/layer and is not simply on a surface of the ply/layer. Any appropriate application method may be utilized to apply the polymeric binder material and particular use of a term such as "coated" is not intended to limit the method by which it is applied onto the filaments/fibers. Useful methods include, for example, spraying, extruding, pad coating, dip coating or roll coating polymers or polymer solutions onto the fibers, as well as transporting the fibers through a molten polymer or polymer solution. Most preferred are methods that substantially coat or encapsulate each of the individual fibers and cover all or substantially all of the fiber surface area with the polymeric binder material.

Whether the fibrous ply constructions forming each of the outer fibrous material layer and the fibrous base layer are unidirectional non-woven, felted non-woven, woven, knitted, or a combination thereof, when a single fibrous layer component (e.g. the outer fibrous material layer or the fibrous base layer) comprises a plurality of merged fibrous plies, the plies may be merged together according to conventional methods in the art. In this regard, a plurality of single plies of the selected fibrous ply type are stacked on top of each other in coextensive fashion and merged, i.e. consolidated, together. When a particular fibrous layer comprises felted non-woven, woven or knitted fibrous plies, each fibrous layer preferably includes from about 1 to about 100 fibrous plies, more preferably from about 2 to about 20 fibrous plies, and most preferably from about 2 to about 10 fibrous plies. When the fibrous layer comprises a plurality of unidirectional non-woven fibrous plies, it is typical for a plurality of such plies to first be formed into a 2-ply or 4-ply unidirectional non-woven fiber "pre-preg" or "pre-preg layer," prior to combining a plurality of such "pre-pregs" or "pre-preg layers" together to form the fibrous layer. Each pre-preg typically includes from 2 to about 6 fibrous plies, typically being cross-plied at 0°/90°, but may include as many as about 10 to about 20 fibrous plies as may be desired for various applications, with each pre-preg also preferably being cross-plied relative to other pre-pregs at alternating 0°/90° orientations. When a fibrous layer comprises such non-woven unidirectional fiber "pre-pregs," it preferably comprises from 1 to about 100 pre-pregs, more preferably from about 2 to about 20 pre-pregs, and most preferably from about 2 to about 10 pre-pregs, each of which preferably comprises two unidirectional plies. The plies forming each pre-preg are typically merged together with a polymeric binder.

With particular regard to fibrous layers comprising a plurality of unidirectional non-woven fibrous plies, it is conventionally known in the art to coextensively stack individual fibrous plies upon each other such that the unidirectionally oriented fibers in each fibrous ply are oriented in a non-parallel longitudinal fiber direction relative to the longitudinal fiber direction of each adjacent ply. Most typically, the fibrous plies are cross-plied orthogonally at 0° and 90° angles wherein the angle of the fibers in even numbered layers is preferably substantially the same and the angle of the fibers in odd numbered layers is preferably substantially the same, but adjacent plies can be aligned at virtually any angle between about 0° and about 90° with respect to the longitudinal fiber direction of another ply. For example, a five ply non-woven structure may have plies oriented at a 0°/45°/90°/45°/0° or at other angles. Such rotated unidirectional alignments are described, for example, in U.S. Pat. Nos. 4,457,985; 4,748,064; 4,916,000; 4,403,012; 4,623,574; and 4,737,402, all of which are incorporated herein by reference to the extent not incompatible herewith. With particular regard to fibrous materials comprising one or more woven fibrous plies, it is also typical for the warp and weft component fibers forming a single fibrous material to be oriented orthogonally to each other.

The total number of fibrous plies in each of the outer fibrous material layer (12) and the fibrous base layer (14) may be different or may be the same relative to each other, and the layers may be of any suitable thickness. Additionally, if a plurality of plies are to be consolidated, the individual plies of each individual fibrous layer may also remain unconsolidated prior to a single consolidation step or molding (i.e., high pressure consolidation) step to combine multiple unconsolidated fibrous layers together with the adhesive system of the disclosure in a single step, or alternatively, each layer may be pre-consolidated prior to consolidating the sections collectively into a unitary article.

The number of fibrous plies in each of the fibrous layers will affect the areal density of each layer, as will the presence of an optional polymeric binder/matrix. In preferred embodiments, each fibrous layer of the disclosure may have an areal density of about 400 g/m² or less, more preferably about 300 g/m² or less, still more preferably about 200 g/m² or less, still more preferably about 150 g/m² or less, still more preferably about 125 g/m² or less, still more preferably about 115 g/m² or less, still more preferably about 110 g/m² or less, still more preferably about 105 g/m² or less, still more preferably about 100 g/m² or less, and most preferably about 95 g/m² or less, with most preferred areal density ranges of from about 10 g/m² to about 95 g/m², to about 15 g/m² to about 95 g/m² or from about 30 g/m² to about 95 g/m².

When a stack of fibrous layers with the optional matrix is consolidated to merge the components of the stack into a monolithic element, consolidation may be conducted with or without pressure via drying, cooling, heating or a combination thereof. Pressurized consolidation is preferred for optimum bonding of the layers. Merging under heat and pressure is performed using methods that are well known, such as by the methods described in U.S. Pat. No. 6,642,159. In this regard, consolidation may be performed at temperatures ranging from about 50° C. to about 175° C., preferably from about 105° C. to about 175° C., and at pressures ranging from about 5 psig (0.034 MPa) to about 2500 psig (17 MPa), for from about 0.01 seconds to about 24 hours, preferably from about 0.02 seconds to about 2 hours. When heating, it is possible that a present polymeric binder coating can be caused to stick or flow without completely melting. Generally, if the polymeric binder material is caused to melt, relatively little pressure is required to form the composite, while if the binder material is only heated to a sticking point more pressure is typically required. As is conventionally known in the art, consolidation may be conducted in a calender set, a flat-bed laminator, a press or in an autoclave. Consolidation may also be conducted by vacuum molding the material in a mold that is placed under a vacuum. Vacuum molding technology is well known in the art. Most commonly, a plurality of orthogonal fiber webs are "glued" together with the binder polymer and run through a flat-bed laminator to improve the uniformity and strength of the bond.

Consolidation may also be performed under higher pressure conditions, a process often referred to in the art as "molding." High pressure merging of the fibrous plies may be achieved by molding under heat and pressure in a suitable molding apparatus at a pressure of from about 50 psi (344.7 kPa) to about 5,000 psi (34,470 kPa), more preferably about 100 psi (689.5 kPa) to about 3,000 psi (20,680 kPa), most preferably from about 150 psi (1,034 kPa) to about 1,500 psi (10,340 kPa). Molding may alternately be conducted at higher pressures of from about 5,000 psi (34,470 kPa) to about 15,000 psi (103,410 kPa), more preferably from about 750 psi (5,171 kPa) to about 5,000 psi, and more preferably from about 1,000 psi to about 5,000 psi. The molding step may take from about 4 seconds to about 45 minutes. Preferred molding temperatures range from about 200° F. (~93° C.) to about 350° F. (~177° C.), more preferably at a temperature from about 200° F. to about 300° F. and most preferably at a temperature from about 200° F. to about 280° F. The pressure under which the fibrous plies are molded has a direct effect on the stiffness or flexibility of the resulting molded product. Particularly, the higher the pressure at which they are molded, the higher the stiffness, and vice-versa. In addition to the molding pressure, the quantity, thickness and composition of the fibrous plies and polymeric binder coating type also directly affects the stiffness of composite.

While each of the molding and consolidation techniques described above are similar and the terms are often used interchangeably in the art, "molding" as used herein also specifically refers to a method of consolidation by bonding fibrous plies/layers together in a batch process, while "consolidation" refers to a method of merging by bonding fibrous plies/layers together in a generally continuous process. Further, molding typically involves the use of a mold, such as a shaped mold or a match-die mold when forming a flat panel, and does not necessarily result in a planar product. Normally consolidation is done in a flat-bed laminator, in a double belt or steel belt press, in a calendar nip set or by wet lamination to produce soft (flexible) body armor fabrics. In addition, molding is typically performed under relatively high pressure, while consolidation is typically performed under relatively low pressure, as discussed above. However, this is not intended to be strictly limiting and molding procedures, such as vacuum molding or autoclave molding, are often performed at relatively low pressures as determined by one skilled in the art. In either process, suitable temperatures, pressures and times are generally dependent on the type of polymeric binder coating materials, polymeric binder content, process used and fiber type.

In accordance with this disclosure, as illustrated in FIG. 1 (not drawn to scale), positioned between surface (20) of the outer fibrous material layer (12) and surface (22) of the fibrous base layer (14) is at least one intermediate layer (16). While FIG. 1 does not show multiple distinct layers (16), reference numeral (16) is merely representative of the intermediate section that may comprise one or more intermediate layers (16).

The intermediate layer(s) comprise at least one of a compatibilizing adhesive scrim, a compatibilizing adhesive polymer layer, and a water repellent. As used herein, an adhesive "scrim" refers to an open/porous structure, and is inclusive of structures such as adhesive netting and adhesive mesh. Adhesives in such a scrim form are commercially available, such as polyurethane scrims. Additionally, as used herein, an adhesive "layer" includes continuous adhesive films as well as continuous or non-continuous coatings formed from the application of an adhesive powder or spray-on adhesive material. In the context of this disclosure, a "compatibilizing" adhesive refers to a polymeric material that is at least partially chemically compatible with both the materials to which it is attached. More particularly, the compatibilizing adhesive is either a copolymer having at least two different monomer components, wherein one monomer component has a strong chemical affinity for one surface that it contacts (i.e., forms a strong bond, with a peel strength of at least 1.5 lbs/inch as determined by ASTM D1876) and another monomer component has a strong chemical affinity for the other surface that it contacts. Such copolymers include segmented copolymers and random copolymers, with the particular type of polymer being selected depending on the composition of the fabrics or other materials to which the adhesive attached and the types of adhesives with which they are most compatible.

In this regard, suitable adhesives for the adhesive polymer layer non-exclusively include polyethylene adhesives and copolymers of ethylene, including cross-linked polyethylene, chlorosulfonated polyethylene, ethylene-propylene copolymers and ethylene-propylene-diene terpolymers, ethylene vinyl acetate (EVA), poly(methyl methacrylate) (PMMA), polypropylene, propylene copolymers, polybutadiene, polyisoprene, natural rubber, polysulfide polymers, thermoplastic polyurethanes and polyurethane elastomers, polychloroprene, plasticized polyvinylchloride using one or more plasticizers that are well known in the art (such as dioctyl phthalate), butadiene acrylonitrile elastomers, poly (isobutylene-co-isoprene), polyacrylates, polyesters, unsaturated polyesters, polyethers, polybutyrals and styrenic block copolymers such as styrene-isoprene-styrene or styrene-butadiene-styrene types. Also suitable are poly(ester-urethane) copolymers such as those described in U.S. Pat. No. 8,980,430, the disclosure of which is incorporated herein by reference to the extent consistent herewith, as well as those described in U.S. Pat. No. 6,887,334, the disclosure of which is also incorporated herein by reference to the extent consistent herewith.

When the compatibilizing adhesive comprises a homopolymer rather than a copolymer, the homopolymer should be modified with or combined with a tackifier or other compatibilizing agent, such as maleic anhydride or a carboxylic acid, such as methacrylic acid. As used herein, a "tackifier" is intended to describe a material that improves the tackiness or stickiness of an adhesive without the formation of chemical bonds. Suitable tackifiers non-exclusively include terpene-based polymers, coumarone-based polymers, phenol-based polymers, rosin-based polymers, rosin esters and hydrogenated rosin esters, petroleum and hydrogenated petroleum-based polymers, styrene-based polymers and mixtures thereof. When incorporated, the tackifier comprises from greater than about 1% by weight to about 60% by weight of said tackifier-polymer combination, more preferably from about 5% by weight to about 30% by weight, and most preferably from about 15% by weight to about 25% by weight.

Useful compatibilizing adhesives also non-exclusively include plastomers and combinations of plastomers with one or more tackifiers, such as those described in commonly-owned U.S. pre-grant publication 2005/0186376, which is incorporated by reference herein to the extent consistent herewith. U.S. PGP 2005/0186376 particularly teaches blends of tackifiers with an ethylene/alpha-olefin copolymer that is particularly useful in bonding two typically non-compatible polymeric films to each other, such as a fluoropolymer film and a non-fluoropolymeric thermoplastic polymer layer. Also useful are ethylene homopolymers, such as low, medium or high density polyethylene, that are modified by blending or otherwise combining with a tackifier as defined above.

In particularly preferred embodiments, the compatibilizing adhesive comprises a polyurethane copolymer, including any of the polyurethane polymers disclosed herein that are described as useful as the binder/matrix polymers, particularly polar polyurethanes having a tensile modulus ranging from about 2,000 psi (13.79 MPa) to about 8,000 psi (55.16 MPa). This list is non-exclusive. In this regard, polyurethanes are particularly attractive because they are made from at least two different co-reactive monomers, namely a polyol (A) (an alcohol containing multiple hydroxyl groups, e.g., a di-alcohol), and a polyisocyanate (B) (a monomer that contains two isocyanate functional groups, e.g., a diisocyanate), which are reacted to form a polyurethane via the following reaction:

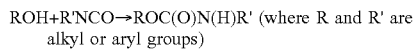
ROH+R'NCO→ROC(O)N(H)R' (where R and R' are alkyl or aryl groups)

The alcohol (ROH) and (R'NCO) isocyanate groups combine to form a urethane linkage. Polyurethane polymers can also be made, for example, by reacting two different di-alcohols and one diisocyanate; one di-alcohol and two different diisocyanates; or two different di-alcohols and two different diisocyanates. In each of these three categories, the ratio between the diol and diisocyanate monomer reactants can be manipulated to produce unique copolymers having a unique chemical affinity for two different polymer or fabric surfaces.

In another embodiment, the adhesive may be a dual layer adhesive system, also referred to herein as a dual ply adhesive, where two polymer plies are joined with each other, preferably being formed by contacting each other and being merged with each other while each is wet, i.e. in liquid form. Such "wet-on-wet" application facilitates adhesion of the polymer plies, wherein the individual plies are unified at the surfaces where they contact each other, as polymer molecules from the polymer layers commingle with each other at their contact interfaces, forming a molecular entanglement region wherein the plies are at least partially fused together when the respective polymers are cured (such as by drying). This method is particularly useful for unifying polymer layers of dissimilar polymer chemistry because it promotes their miscibility and facilitates their adherence to each other. The combination will form a single layer having one polymer type at one planar surface of the adhesive layer and another polymer type at the other planar surface of the adhesive layer. Methods of forming such a dual layer adhesive include coextrusion, blown film coextrusion, coating, dipping, etc., as would be determined by one skilled in the art. Particularly preferred are the methods taught in commonly-owned U.S. Pat. Nos. 7,993,478 and 7,875,563, each of which is incorporated herein by reference to the extent consistent with this disclosure. Said methods are not intended to be strictly limiting and a dual layer adhesive may be formed by other means that may be determined by one skilled in the art, including applying one wet polymer (e.g., in molten, solution, emulsion or dispersion form) onto a dry polymer, followed by drying/cooling/curing the wet polymer.

Suitable polymers that may be combined to form such a dual layer adhesive include a wide variety of thermoplastic or thermosetting polymers. Suitable thermoplastic polymer materials include polyolefin homopolymers, polyolefin copolymers, cyclic olefin homopolymers, cyclic olefin copolymers, vinyl polymers, ethylene vinyl acetate copolymers, ethylene octane copolymers, acrylonitrile copolymers, acrylic polymers, polyesters such as polyethylene terephthalate (PET) and PET copolymers, polyamides, polyvinyl chloride, polyvinylidene chloride, polycarbonates, polystyrenes, styrenic copolymers, polyisoprene, polyurethanes, fluoropolymers, ethylene vinyl acetate (EVA), poly(methyl methacrylate) (PMMA), ethylene ethyl acrylate, ethylene acrylic acid copolymers, as well as mixtures and copolymers of the above polymers.

Suitable polyolefins include polymers of alpha-olefin monomers having from about 3 to about 20 carbon atoms and include homopolymers, copolymers (including graft copolymers), and terpolymers of alpha-olefins. Illustrative homopolymer examples include low density polyethylene (LDPE), linear low density polyethylene (LLDPE), metallocene-linear low density polyethylene (m-LLDPE), very-low density polyethylene (VLDPE), linear very-low density polyethylene (LVLDPE), ultra-low density polyethylene (ULDPE), linear ultra-low density polyethylene (LULDPE), medium density polyethylene (MDPE), linear medium density polyethylene (LMDPE), and high density polyethylene (HDPE), polypropylene and propylene copolymers, polybutylene, polybutene-1, poly-3-methylbutene-1, poly-pentene-1, poly-4,4 dimethylpentene-1, poly-3-methyl pentene-1, polyisobutylene, poly-4-methylhexene-1, poly-5-ethylhexene-1, poly-6-methylheptene-1, polyhexene-1, polyoctene-1, polynonene-1, polydecene-1, polydodecene-1 and co-polymers and mixtures thereof. Illustrative polyolefin copolymers and terpolymers include copolymers and terpolymers of alpha-olefins with other olefins such as ethylene-propylene copolymers; ethylene-butene copolymers; ethylene-pentene copolymers; ethylene-hexene copolymers; and ethylene-propylene-diene copolymers (EPDM). The term polyolefin as used herein also includes acrylonitrilebutadiene-styrene (ABS) polymers, copolymers with vinyl acetate, acrylates and methacrylates and the like. The most preferred polyolefins are ethylene polymers, copolymers, and terpolymers. The above polyolefins may be obtained by any known process. Polyolefins useful herein may have a weight average molecular weight of about 1,000 to about 1,000,000, and preferably about 10,000 to about 500,000 as measured by high performance liquid chromatography (HPLC). The most preferred polyolefins are polyethylene, polypropylene, polybutylene and copolymers, and blends thereof. The most preferred polyolefin is polyethylene. The most preferred polyethylenes are low density polyethylenes.

Suitable polyamides non-exclusively include homopolymers or copolymers selected from aliphatic polyamides and aliphatic/aromatic polyamides having a weight average molecular weight of from about 10,000 to about 100,000. General procedures useful for the preparation of polyamides are well known to the art. Useful polyamide homopolymers include poly(4-aminobutyric acid) (nylon 4), poly(6-aminohexanoic acid) (nylon 6, also known as poly(caprolactam)), poly(7-aminoheptanoic acid) (nylon 7), poly(8-aminooctanoic acid)(nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12), nylon 4,6, poly(hexamethylene adipamide) (nylon 6,6), poly(hexamethylene sebacamide) (nylon 6,10), poly(heptamethylene pimelamide) (nylon 7,7), poly(octamethylene suberamide) (nylon 8,8), poly(hexamethylene azelamide) (nylon 6,9), poly(nonamethylene azelamide) (nylon 9,9), poly(decamethylene azelamide) (nylon 10,9), poly (tetramethylenediamine-co-oxalic acid) (nylon 4,2), the polyamide of n-dodecanedioic acid and hexamethylenediamine (nylon 6,12), the polyamide of dodecamethylenediamine and n-dodecanedioic acid (nylon 12,12) and the like. Useful aliphatic polyamide copolymers include caprolactam/hexamethylene adipamide copolymer (nylon 6,6/6), hexamethylene adipamide/caprolactam copolymer (nylon 6/6,6), trimethylene adipamide/hexamethylene azelaiamide copolymer (nylon trimethyl 6,2/6,2), hexamethylene adipamide-hexamethylene-azelaiamide caprolactam copolymer (nylon 6,6/6,9/6) and the like. Also included are other nylons which are not particularly delineated here. Of these polyamides, preferred polyamides include nylon 6, nylon 6,6, nylon 6/6,6 as well as mixtures of the same. Of these, nylon 6 is most preferred.

Aliphatic polyamides may be obtained from commercial sources or prepared in accordance with known preparatory techniques. For example, poly(caprolactam) can be obtained from AdvanSix Inc. of Morris Plains, N.J. Exemplary of aliphatic/aromatic polyamides include poly(tetramethylenediamine-co-isophthalic acid) (nylon 4,1), polyhexamethylene isophthalamide (nylon 6,1), hexamethylene adipamide/hexamethylene-isophthalamide (nylon 6,6/61), hexamethylene adipamide/hexamethyleneterephthalamide (nylon 6,6/6T), poly (2,2,2-trimethyl hexamethylene terephthalamide), poly(m-xylylene adipamide) (MXD6), poly (p-xylylene adipamide), poly(hexamethylene terephthalamide), poly(dodecamethylene terephthalamide), polyamide 6T/6I, polyamide 6/MXDT/I, polyamide MXDI, and the like. Blends of two or more aliphatic/aromatic polyamides can also be used. Aliphatic/aromatic polyamides can be prepared by known preparative techniques or can be obtained from commercial sources. Other suitable polyamides are described in U.S. Pat. Nos. 4,826,955 and 5,541,267, which are incorporated herein by reference.

Also suitable for serving as one of the components of such a dual layer adhesive are the polyurethane polymers discussed in this disclosure, including both polyester and polyether based polyurethanes.

In the most preferred embodiments, the outer fibrous layer (12) comprises a woven nylon-fiber based fabric (i.e., mil-spec nylon fabric) and the fibrous base layer (14) comprises a woven polyethylene fiber-based fabric. Accordingly, in such an embodiment, when a dual layer adhesive is used, one of the two adhesive plies of the dual layer adhesive is most preferably a polyamide polymer film and the other adhesive ply is a polyethylene (or other polyolefin) polymer film, i.e., a polyamide/polyethylene (PA/PE) dual layer adhesive, wherein the polyamide side of the adhesive is positioned in contact with the nylon-fiber based fabric and the polyethylene side of the adhesive is positioned in contact with the polyethylene fiber-based fabric. In an embodiment where the nylon-fiber based fabric is provided with a surface coating, it is most preferred that the type of polymer forming the adhesive ply that is positioned to contact the nylon-fiber is compatible with that coating. For example, if the nylon fiber-based fabric is coated with a polyurethane, e.g. a polyurethane water repellent, it is most preferred that a dual layer adhesive comprise a polyurethane/polyethylene (PU/PE) dual layer adhesive, wherein the polyurethane side of the adhesive is in contact with the polyurethane coated surface of the nylon fabric.

Any of the adhesive materials described herein may optionally also include one or more conventional additives whose uses are well known to those skilled in the art. The use of such additives may be desirable in enhancing the processing of the compositions as well as improving the products or articles formed therefrom. Examples of such include: oxidative and thermal stabilizers, lubricants, release agents, flame-retarding agents, oxidation inhibitors, dyes, pigments and other coloring agents, ultraviolet light absorbers and stabilizers, anti-microbial agents, organic or inorganic fillers including particulate and fibrous fillers, reinforcing agents, nucleators, plasticizers, as well as other conventional additives known to the art. Such may be used in amounts, for example, of up to about 30% by weight of the overall adhesive layer composition.

As noted above, the selection of the most appropriate polymers for such a dual layer film or other compatibilizing adhesive layer/scrim, the selection of the adhesive polymers will depend on the type of fibers forming the fibrous layers (12) and (14), as well as the compatibility of the different layers (16) with each other. In this regard, combinations of fabrics and adhesives having similar chemistries will bond uniquely well to each other, because a particular fiber type will have a naturally superior affinity for an adhesive of the same polymer type. For example, polyethylene fibers will bond better with polyolefin-based adhesives than with polyamide (nylon) based adhesives, and aramid or nylon fibers will bond better with polyamide-based adhesives. In addition, as noted above, some commercially available fibrous materials are often provided by the manufacturer with protective coatings already on one or both of their planar outer surfaces, and the most appropriate selections for the adhesives will often depend on compatibility with said protective coatings. For example, CORDURA® brand nylon fabrics are typically sold by Invista North America S.A R.L. with a coating of a polyurethane on one of its surfaces. Accordingly, when an intermediate layer (16) is coupled with a CORDURA® nylon fabric as layer (12), the best bond will be achieved when said polymer film comprises a polyurethane film.

In addition to, or as an alternative to the compatibilizing adhesive layer, the intermediate layer (16) may comprise a layer of a water repellent. The water repellent is often used together with a compatibilizing adhesive layer or compatibilizing adhesive scrim, but a separate adhesive is not required if the water repellent itself has strong adhesive properties and is hydrophobic, thus providing the dual function of repelling water and serving as a compatibilizing adhesive. Particularly suitable water repelling adhesives are hydrophobic, non-polar polyurethanes, which may be applied as water-based (aqueous) dispersions or solvent-based dispersions. Also useful are thermosetting polymers such as phenolic resins and epoxies, but thermoplastic water repellents are most preferred herein to promote composite flexibility.

In embodiments incorporating a water repellent between the outer fibrous material and the fibrous base material, the peel strength of the composite will be greatest when a separate adhesive layer or scrim (16) is incorporated. In this regard, water repellents are known to be either durable or non-durable. A "durable" water repellent is a coating that is not removed easily and will last after washing, although the effectiveness of the coating may diminish with repeated laundering. In this regard, the term "durable" is inclusive of permanent finishes (i.e., a finish that will last for the life of the fabric), and semi-durable finishes (i.e., finishes that will last for one or two washes before having to be reapplied). A non-durable water repellent is easily washed off the fabric, typically after laundering only once. In this regard, in order to attain the best peel strength, an intermediate water repellent (16) should only comprise a durable water repellent. Suitable durable water repellents non-exclusively include fluoropolymers, such as polychlorotrifluoroethylene (PCTFE), fluorine-modified polymers, silicones, and non-polar polyurethanes as discussed above.

While non-durable water repellents should not be incorporated between surfaces (20) and (22) of the outer fibrous material layer and the fibrous base layer, respectively, it is acceptable for a non-durable water repellent to be coated on either or both of the outer surfaces (18) and (24) of fabrics (12) and (14), respectively. Useful non-durable water repellents non-exclusively include natural and synthetic waxes, including those described in U.S. Pat. No. 7,994,075, which is incorporated by reference to the extent consistent herewith. Particularly useful waxes are paraffin wax, microcrystalline waxes, Fischer-Tropsch waxes, polyolefin waxes, vegetable waxes, halogenated paraffin waxes and the like. Also suitable are polyvalent metal salts, such as aluminum and zirconium salts. Similarly, durable water repellent coatings may also be applied to surfaces (18) and/or (24) as desired.

Each of the adhesive films, adhesive scrims, water repellent layers and other polymer films are preferably very thin. Although each may have a different thickness, each has a preferred thicknesses of from about 1 µm to about 250 µm, more preferably 5 µm to about 150 µm, more preferably from about 10 to about 100 µm, still more preferably from about 15 µm to about 100 µm, and most preferably from about 25 µm to about 100 µm. While such thicknesses are preferred, it is to be understood that other thicknesses may be produced to satisfy a particular need and yet fall within the scope of the present disclosure.

Whether a single intermediate layer (16) is incorporated or multiple intermediate layers (16) are incorporated, the fibrous layers (12) and (14) are bonded together with the intermediate layer(s) (16) under pressure using conventional consolidation/lamination or high pressure molding techniques as stated above, whereby a single, consolidated, unitary, monolithic element is formed. As when forming the individual fibrous layers (12) and (14) if they comprise multiple fibrous plies, when forming a consolidated composite combining the fibrous layers (12) and (14) with the intermediate layers (16) into a single, unitary composite article, all the plies/layers are overlapped on top of each other coextensively to form a stack, followed by consolidating the layers together at once. In embodiments where multiple intermediate layers (16) are present, they are bonded together to each other and each of the outer fibrous material layer and the fibrous base layer are bonded to one of said intermediate layers, thereby merging all the intermediate layers (16) and the two fabrics (12) and (14) into a single, unitary composite article.

As stated above, in the most preferred embodiments the outer fibrous material layer (12) and fibrous base layer (14) each individually comprise, consist essentially of or consist of only one single ply of woven fabric, which is particularly suitable for the fabrication of flexible tactical vest or flexible plate carrier articles, such as the slotted, webless articles described herein. These two fabric plies, together with the desired intermediate layers (16) are to be laminated together under heat and low pressure, rather than by high pressure molding techniques. As noted herein, laminating is performed by positioning the individual layers on one another under conditions of sufficient heat and pressure to cause the layers to combine into a unitary structure, wherein lamination is conducted at temperatures ranging from about 95° C. to about 200° C., preferably from about 105° C. to about 175° C., at pressures ranging from about 5 psig (0.034 MPa) to about 100 psig (0.69 MPa), for from about 5 seconds to about 36 hours, preferably from about 30 seconds to about 24 hours. These conditions, however, may vary as determined by one skilled in the art. Such lamination of these most preferred articles is also most preferably performed in a flat-bed laminator rather than consolidating/bonding the layers together in a static or isobaric press.

In alternate embodiments where one or both of the outer fibrous layer (12) and fibrous base layer (14) comprise a plurality of fibrous layer, merging by high pressure molding may be appropriate. As also noted previously, high pressure merging of layers (12), (14) and (16) may be achieved by molding under heat and pressure in a suitable molding apparatus at a pressure of from about 50 psi (344.7 kPa) to about 5,000 psi (34,470 kPa), more preferably about 100 psi (689.5 kPa) to about 3,000 psi (20,680 kPa), most preferably from about 150 psi (1,034 kPa) to about 1,500 psi (10,340 kPa).

In order to achieve the greatest possible peel strength between the outer fibrous material layer (12) and the fibrous base layer (14), stitching is expressly excluded as a sole means of attaching the different sections together. It has been found that bonding the sections together by adhesive molding or adhesive consolidation will increase inter-laminar strength between the different sections, which translates to greater peel strength between the individual material layers, higher stiffness of the consolidated composite, and greater tear resistance of the consolidated composite. In this regard, the peel strength between the outer fibrous material layer (12) and the fibrous base layer (14) after consolidation into a unitary article is greater than 1.5 lbs/inch (680.4 g/inch), more preferably greater than 2.0 lbs/inch (907.2 g/inch) and most preferably greater than 2.5 lbs/inch (1134.0 g/inch). The aforementioned peel strength values are determined by the procedures of ASTM D1876.

The composites of this disclosure are useful for the fabrication of articles that may be used in many industries where fiber strength and durability are important. Such uses include wearable articles such as safety clothing, sports apparel and outdoor wear, as well as other non-wearable articles such as gear bags and pouches, luggage, canopies, curtains, tents, parachutes, tarps, etc. In some applications, particularly non-armor applications, the outer surfaces (18) and (24) of the fabrics may also be coated with materials to improve properties such as tear resistance, abrasion resistance, cut resistance, water resistance and fire resistance. Suitable coating materials are well known in the art.

Figure 4:
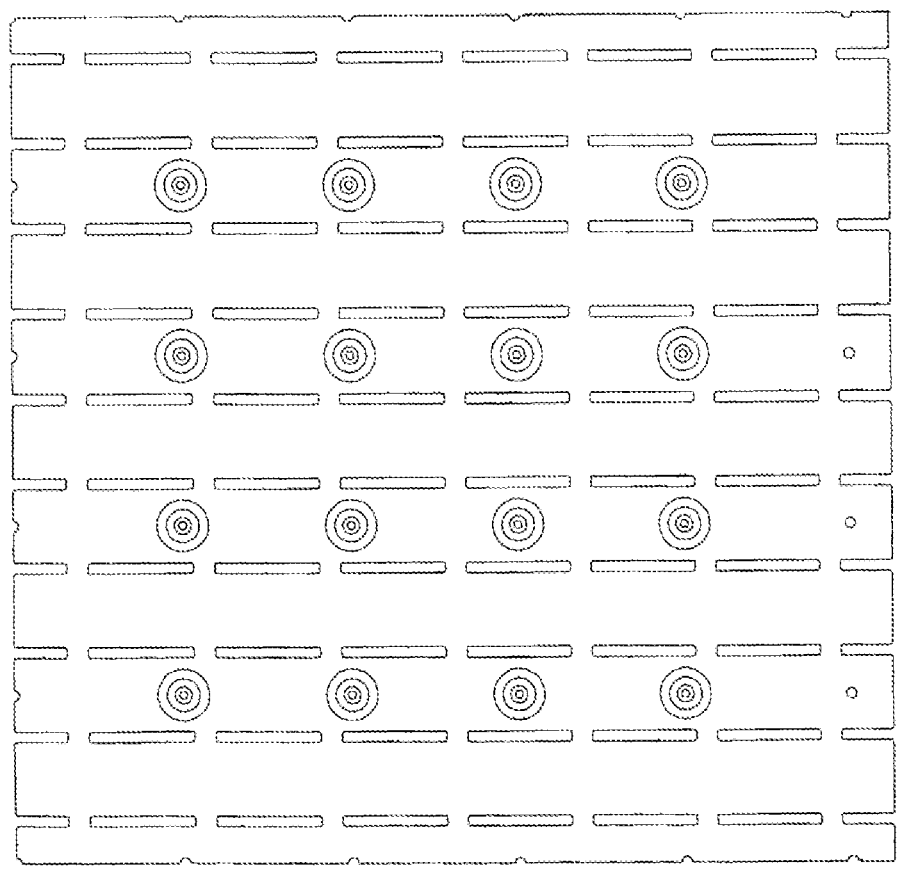
FIG. 4 is a perspective view schematic representation of the prior art FAV™ Advanced Webless System having slots cut through the fabric as described and illustrated in U.S. Pat. No. 7,200,871.

As noted above, the composites of this disclosure are also particularly useful for the formation of ballistic plate carriers, such as improved scalable plate carriers, improved outer tactical vests and soldier plate carrier systems. One exemplary and commercially available type of plate carrier is the TAC PR™ Advanced Webless System from Safariland LLC of Jacksonville, Fla. as described in their U.S. Pat. No. 7,200,871, which is incorporated by reference herein to the extent consistent herewith. In this prior art construction, which is illustrated in FIG. 4, a slotted carrier is fabricated from a single fabric without a backing of high tenacity fibrous material as introduced in the present disclosure. The slots (holes) cut into the fabric are utilized as attachment points for modular accessories or for holding accessory pouches, which can pull down on the fabric and cause sagging of the fabric. This type of construction is appreciably improved when fabricated with the composite materials of the present disclosure because the enhanced composite strength resists fabric fatigue and sagging.

FIG. 2 schematically illustrates such a slotted fabric construction formed from the composite (10) of this disclosure having a plurality of slots (perforations) (26) cut into and completely through the entire thickness of the composite material to provide attachment points for accessories. FIG. 3 schematically illustrates a slotted composite (10) having a modular attachment (28) hanging from a slot. As described in detail in U.S. Pat. No. 7,200,871, and as shown in FIG. 4, the fabric includes several rows (arrays) of rotary die cut slots (perforations) that extend through the fabric sheet to accommodate straps for MOLLE removable pockets. The slots as described therein are generally rectangular and have dimensions of 1.25 inches×⅛ inch, and said slots are spaced apart by 1.5 inches horizontally and the rows are spaced apart by 1.0 inch vertically. However, these dimensions are only illustrative and not intended as strictly limiting. The slot shapes may also vary. For example, they may be cut to have a horizontal oval shape rather than a rectangular shape as shown in FIG. 4. Additionally, while it is most efficient to form the arrays of slots using a conventional rotary die cutting machine, any suitable alternative method may be used, such as steel rule die cutting or laser cutting. The number of rows of slots and the number of slots in each row may also vary as desired by the manufacturer and are not intended as strictly limiting. In one exemplary prior art tactical carrier commercially available as the TAC PR™ Advanced Webless System from Safariland LLC, a tactical carrier is fabricated having from 10 to 14 rows of slots cut into a front facing portion of the vest cover, each row having from 5 to 8 slots.

Finally, while these slots are cut into the fabric to provide attachment points for MOLLE-type accessories, etc., and the problem of slot sagging is ameliorated by the incorporation of a high strength fabric as described herein, the slots are still susceptible to being temporarily pulled down by the weight of the attachments. It has been discovered that when this occurs, the exterior surface (24) of the high tenacity fabric becomes exposed through the perforations. This is highly undesirable because the outer fibrous material (12), at least in a plate carrier application, is often colored, typically with a camouflage colored appearance, while the natural appearance of the high tenacity fibers forming the fibrous base material (14) are typically white or yellow, colors that clash with the camouflage colored appearance of surface (18) and which makes the user more noticeable during use. Accordingly, to overcome this problem, it is particularly preferred herein to provide the surface (24) of the fibrous base material (14) with a colored appearance that blends in, is camouflaged by or otherwise does not stand out relative to the color(s) of surface (18).

In this regard, for the purposes of this disclosure, each of the outer fibrous material layer (12) and fibrous base layer (14) are preferably colored rather than non-colored. As used herein, "colored" is defined as a color achieved by the application of at least one colorant (e.g., dye and/or pigment) or colorant composition (e.g., a colored polymeric film) onto the fibers. For some low tenacity fibers, the colorant may even incorporated within the fibers that form the fibrous material.

In this regard, some types of fibers/fabrics are colored more easily than others. For example, it is well known that nylon fibers are easily colored. A nylon fabric can be colored with a single colorant, for example, by soaking the fibers in a bath of a standard aqueous dye solution or organic solvent-based dye solution. It is also well known to color nylon and other fabrics with decorative images or with patterns, such as camouflage patterns, by conventional textile printing methods wherein a colorant is bonded to the surface of a fabric. Such methods include hand block printing; perrotine printing; engraved copperplate printing; roller, cylinder, or machine printing; stencil printing; screen printing; and digital textile printing. Suitable types of colorants suitable for creating and/or applying any particular camouflage pattern or decorative image would be readily determined by one skilled in the art and non-exclusively include acid dyes, basic dyes, disperse dyes, reactive dyes, natural dyes and all-purpose dyes, such as Rit® brand dyes commercially available from Phoenix Brands LLC of Stamford, Conn. Exemplary dyes and method used for the printing of camouflage patterns on fabrics are described in detail in, for example, U.S. Pat. Nos. 6,805,957; 9,062,938 and 9,074,849, each of which is owned by the U.S. government, and each of which is incorporated by reference herein to the extent consistent herewith. Mil-spec fabrics are often commercially available in a pre-colored form consistent with specific camouflage colored appearances.

As an alternative to directly coloring the fibers, the colored appearance may be provided by applying a colored polymeric material to one or both of surfaces (18) and (24). In one preferred embodiment, the colored polymeric material is in the form of a colored polymeric film. Preferred polymer films non-exclusively include colored thermoplastic polymer layers including polyolefins, polyamides, polyesters (particularly polyethylene terephthalate (PET) and PET copolymers), polyurethanes, vinyl polymers, ethylene vinyl alcohol copolymers, ethylene octane copolymers, acrylonitrile copolymers, acrylic polymers, vinyl polymers, polycarbonates, polystyrenes, fluoropolymers and the like, as well as co-polymers and mixtures thereof, including ethylene vinyl acetate (EVA) and ethylene acrylic acid. Of these, polyolefin and polyamide layers are preferred. The preferred polyolefin is a polyethylene. Non-limiting examples of useful polyethylenes are low density polyethylene (LDPE), linear low density polyethylene (LLDPE), medium density polyethylene (MDPE), linear medium density polyethylene (LMDPE), linear very-low density polyethylene (VLDPE), linear ultra-low density polyethylene (ULDPE), high density polyethylene (HDPE) and co-polymers and mixtures thereof.

Such polymer layers may be fabricated and bonded to the surface (18) of the outer fibrous material layer (12) and/or the surface (24) of the fibrous base layer (14) using well known techniques, such as conventional extrusion and thermal lamination techniques. In this regard, the polymer layer may be applied either before, during or after the merging together the individual fiber plies of each individual section or before, during or after the merging together of all the collective layers/sections into a unitary composite. Laminating is performed the conventional techniques already described herein. Such polymer layers may also optionally be bonded to the composite surfaces with hot glue or hot melt fibers as would be understood by one skilled in the art. Such polymer films are preferably very thin, having preferred layer thicknesses of from about 1 µm to about 250 µm, more preferably from about 5 µm to about 25 µm and most preferably from about 5 µm to about 9 µm. While such thicknesses are preferred, it is to be understood that other thicknesses may be produced to satisfy a particular need and yet fall within the scope of the present disclosure.

Alternatively, rather than attaching a discrete polymer film onto the fabric surfaces (18) and/or (24), if either or both of the fibrous materials incorporate a polymeric binder or matrix material, a suitable colorant may be added to the binder/matrix composition. In this regard, any desirable color can be achieved with the appropriate selection of colorant and binder polymer, and wherein coloration of the polymer may be achieved simply by combining a coloring agent with the binder polymer or polymer solution. Examples of suitable colorants include dyes and pigments, both aqueous and organic, as would be determined by one skilled in the art. Suitable dyes non-exclusively include those dyes listed above, i.e., acid dyes, basic dyes, disperse dyes, reactive dyes, natural dyes and all-purpose dyes, such as Rit® brand dyes commercially available from Phoenix Brands LLC of Stamford, Conn. A particular example of a useful colorant is copper phthalocyanine, and the like. Any conventionally known method may be used to blend the colorant into the polymer, and typically the amount of colorant (e.g., dye or pigment) added to the polymeric material will range from about 0.5 to about 20 weight percent, more preferably from about 2 to about 15 weight percent, and most preferably from about 4 to about 10 weight percent by weight of the polymeric material.

As noted above, the outer fibrous material layer (12) is intended to be colored with one or more colorants that give it a colored, visual appearance that is preferably a camouflage pattern, i.e., a colored appearance that blends in with particular surrounding environments, and if the fibrous base layer (14) is not colored it will have a different colored appearance (the natural color of the fibers, typically white or yellow) than the outer fibrous material layer, causing it to visually stand out, and potentially making a user more recognizable, if exposed through the slotted fabric. Therefore, when coloring the fibrous base layer (14), the selected color(s) should blend in with at least one color of the outer fibrous material layer (12) to thereby at least partially impair visual exposure of the fibrous base layer through said perforations. More particularly, the outer second surface (24) of the fibrous base layer (14) should be provided with a colored appearance comprising one or more colors such that exposed portions of the fibrous base layer surface (24) are camouflaged by the colors of the outer first surface (18) of the outer fibrous material layer (12).

Figure 5:
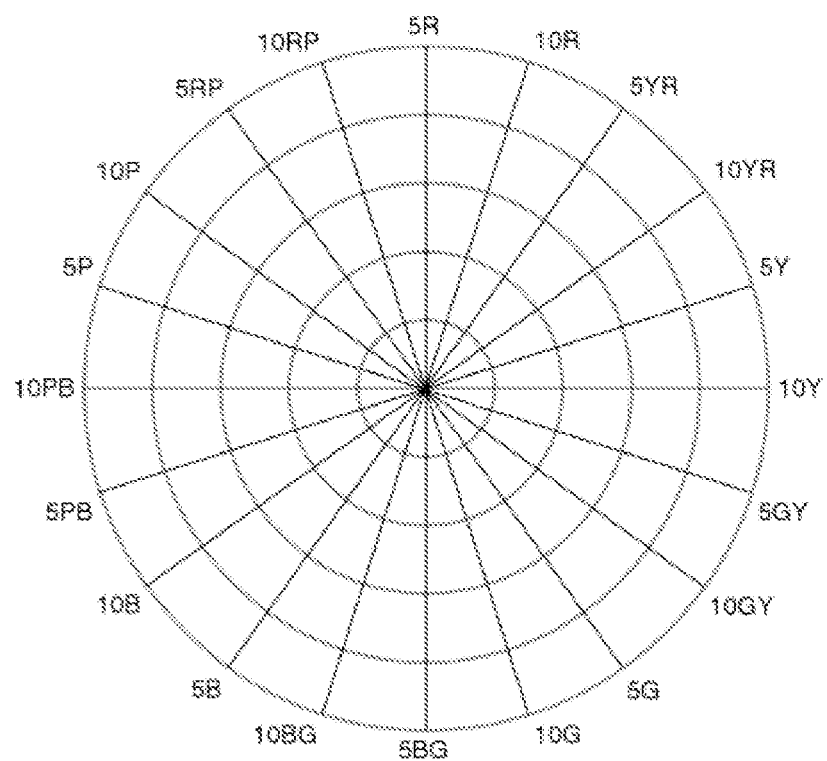
FIG. 5 is an illustration of the Munsell hue scale.

In order to accomplish this objective, it is desired that the colorant(s) used to color the fibrous base material (14) is/are either identical to, similar to or analogous to at least one of the colorant(s) used to color the outer fibrous material layer (12). In this regard, a well-known method for identifying colors is the Munsell color system, and a standard method for valuation of a particular color under the Munsell system is set forth in ASTM D1535. The Munsell Color System is a three dimensional color space that specifies colors based on three attributes: hue, value (lightness) and chroma (color purity, strength). It has been revised from its original specifications by the Colorimetric Committee of the Optical Society of America, and with these changes it is often referred to today as the "Renotation Munsell" system, but the terms "Munsell" and "Renotation Munsell" are used interchangeably herein. In this regard, the "Munsell hue" of the color means the attribute of color which can be found in the spectrum of light. In this color system, red (R), yellow (Y), green (G), blue (B), and purple (P) are selected as five principle hue sectors; and yellow-red (YR), green-yellow (GY), blue-green (BG), purple-blue (PB), and red-purple (RP) are arranged therebetween as five intermediate hue sectors. As illustrated in FIG. 5, which illustrates the configuration of the Munsell hue scale, the hues are arranged in the following order, beginning with red (R):

R-YR-Y-GY-G-BG-B-PB-P-RP

As seen in FIG. 5, after RP the scale returns to R. Each of these ten hue sectors has 10 integral divisions ("degrees" or "steps" of hue) and thus when shown will be prefixed by a number from 1 to 10. In this regard, a degree of 5 is considered the primary color of the hue (e.g., 5R is primary red, 5YR is primary yellow-red, 5Y is primary yellow, etc.) because they are the midpoints of the sectors. Thus there are 100 different hues on the Munsell hue scale.

The "Munsell value", also referred to herein as the "color value," indicates how light or dark a color is, also with a range of 0 to 10. In this color system, black has a Munsell Value of 0 and white has a Munsell Value of 10. The "Munsell chroma" means sharpness or intensity of color. In the Munsell color system, achromatic color (grey) has a chroma of 0 (also identified with the letter N for neutral) and increases as a color becomes more saturated than a grey of the same Munsell hue and value. There is no intrinsic upper limit to chroma. Its value increases as the color sharpness increases, and upper limits for a particular color are dependent on Munsell hue and value.

In the preferred embodiments, the color of the colorant (e.g., colored polymeric film, or dye, or pigment) applied to the fibrous base layer should have a Munsell hue that is identical to, similar to, or at least analogous to the Munsell hue of at least one color of said colored outer surface (18) of the outer fibrous material layer (12). In this regard, for the purposes of this disclosure, an "analogous" Munsell hue means a hue within ±5 steps/degrees on the Munsell hue scale, and a "similar" Munsell hue means a hue within ±2.5 steps/degrees on the Munsell hue scale. For example, an analogous color with respect to 5B is in the range of 10B to 10BG (see FIG. 5 for clarity), and a "similar" color with respect to 5YR is in the range of 2.5YR to 7.5YR.

Accordingly, the actual color or colors of the outer fibrous material layer (12) surface (18) may vary widely depending on the environment in which it is intended to appear camouflaged, and the color(s) of the colorant/colored film applied to the fibrous base layer (14) surface (24) is not particularly important as long as it has a hue that is within 10 steps of the hue of at least one color of the outer fibrous material layer (12) as per the Munsell hue scale. With regard to the Munsell value and Munsell chroma, it is also preferred that the color of the colorant applied to the fibrous base layer (14) is compatible with the outer fibrous material layer (12). As noted above, the Munsell value scale ranges from 0 (black) to 10 (white), and it is preferred, but not required, that the color of the colorant applied to the fibrous base layer (14) has a Munsell value within 2.5 of the Munsell value of at least one of the colors of the outer fibrous material layer. It is also preferred, but not required, that the color of the colorant applied to the fibrous base layer (14) has a Munsell chroma within 2.5 of the Munsell chroma of at least one of the colors of the outer fibrous material layer (12). Alternatively, regardless of the color of the surface (18) of the outer fibrous material layer (12), it is generally acceptable for the outer surface (24) of the fibrous base layer (14) to be colored black, which does not easily attract the human eye and is a significant improvement over the natural yellow or white appearance of the high tenacity fibers even if it is not within the specifically preferred Munsell parameters described above.

In use, when forming the composites of the disclosure into a vest, vest cover or plate carrier article, the outer fibrous material layer (12) is positioned as the outside facing surface against which modular attachments will be positioned, as shown in FIG. 3. In this regard, it has been unexpectedly discovered that when merging the outer fibrous material layer (12) with the fibrous base layer (14), the dimensional stability of the consolidated combination of the two layers is best when the fibers of the outer fibrous material layer are oriented at +45° and −45° to the fibers of the fibrous base layer. This may be accomplished by cutting sections on a bias from a larger 0°/90° fabric, or by physically orienting a 0°/90° fabric at +45°/−45° angles relative to the other fabric when positioning the layers together prior to consolidation. This fiber layer configuration is particularly desirable when the composites of the disclosure are employed in the fabrication of articles having a webless construction as discussed above. By combining the low tenacity outer fabric with a high tenacity base fabric, and orienting the layers so that the fibers of the high tenacity base fibrous material layer are at +45°/−45° angles relative to 0°/90° fibers of the outer fibrous material layer, the durability of the slots (see FIGS. 3 and 4) is improved and the tendency of the fabric at the lower periphery of the slots to stretch and sag is reduced.

In order to further improve the durability of the composites of the disclosure, without forming an article having excessive weight, it is also preferred that the each of the outer fibrous material layer (12) and the fibrous base layer (14) has an areal density of about 400 g/m² or less, more preferably about 300 g/m² or less, still more preferably about 200 g/m² or less, still more preferably about 150 g/m² or less, still more preferably about 125 g/m² or less, still more preferably about 115 g/m² or less, still more preferably about 110 g/m² or less, still more preferably about 105 g/m² or less, still more preferably about 100 g/m² or less, and most preferably about 95 g/m² or less, with most preferred areal density ranges of from about 15 g/m² to about 95 g/m² or from about 30 g/m² to about 95 g/m². In a particularly preferred embodiment, the outer fibrous material layer has an areal density of from about 200 g/m² to about 400 g/m² and the fibrous base layer has an areal density of from about 15 g/m² to about 110 g/m², more preferably from about 30 g/m² to about 110 g/m². In preferred embodiments, the sum of all layers produces a composite (10) having a total combined areal density of from about 60 g/m² to about 800 g/m², more preferably from about 100 g/m² to about 600 g/m², and most preferably from about 200 g/m² to about 500 g/m².

In this regard, it is most preferred that the outer fibrous material layer (12) has an areal density of greater than 50% of the total combined areal density of the entire composite (10). In one embodiment, the areal density of the outer fibrous material layer (12) is greater than about 60% of the total combined areal density of all combined layers. In another embodiment, the areal density of the outer fibrous material layer (12) is greater than about 70% of the total combined areal density of all combined layers. In most preferred embodiments, the outer fibrous material layer (12) comprises from about 60% to about 75% of the total combined areal density of all the composite article layers combined and the fibrous base layer (14) comprises from about 20% to about 30% of the total combined areal density of all the composite article materials.

The thickness of each fibrous material section will generally correspond to the thickness of the individual fibers and the number of fiber plies/layers incorporated into the composite. A preferred woven fabric, knitted fabric or felted non-woven fabric will have a preferred thickness of from about 25 μm to about 600 μm per ply/layer, more preferably from about 50 μm to about 385 μm and most preferably from about 75 μm to about 255 μm per ply/layer. A preferred two-ply unidirectional non-woven fabric composite will have a preferred thickness of from about 12 μm to about 600 μm, more preferably from about 50 μm to about 385 μm and most preferably from about 75 μm to about 255 μm.

The following examples serve to illustrate preferred embodiments of the disclosure:

EXAMPLE 1

A consolidated composite laminate is fabricated that comprises a single mil-spec Mil-DTL-32439 woven nylon fabric (500 denier nylon fibers) having a camouflage pattern that is adhered to a single woven polyethylene fabric (375 denier SPECTRA® 1000 fibers; plain weave construction; pick count of 32×32 ends/inch; areal density=0.82 lb/ft²). The fabrics are attached to each other by lamination with an intermediate dual layer adhesive that is a polyurethane/polyethylene (PU/PE) dual layer adhesive film. The exterior surface of the nylon is coated with a durable water repellent and the interior surface of the nylon is coated with a polyurethane coating. A black polyethylene film is laminated to the outermost surface of the woven polyethylene fabric to provide the surface of the polyethylene fabric with a dark colored appearance.

EXAMPLE 2

Example 1 is repeated except the interior surface of the nylon fabric is not coated with a polyurethane.

EXAMPLE 3

Example 1 is repeated wherein the interior surface of the nylon fabric is directly coated with a polyurethane coating and a durable water repellent is coated on top of the polyurethane coating. The durable water repellent is applied by dip coating after application of the polyurethane coating such that all surfaces of the nylon are coated with the water repellent.

EXAMPLE 4

Example 2 is repeated except the fabrics are attached to each other by lamination with an intermediate dual layer adhesive that is a polyamide/polyethylene (PA/PE) dual layer adhesive film rather than a PU/PE dual layer film.

EXAMPLES 5A-5D

A plate carrier article having a webless, slotted construction as described in U.S. Pat. No. 7,200,871 is fabricated from each of the composites described in Examples 1-4. The slots are cut through the entire thickness of the composite so that each slot is an opening in the fabric allowing the hanging of modular attachments therefrom.

EXAMPLE 6

A consolidated composite is fabricated that comprises a mil-spec Mil-DTL-32439 woven nylon fabric (500 denier nylon fibers) having a camouflage pattern that is adhered to a two-ply (0°/90°), non-woven polyethylene fabric. The non-woven polyethylene fabric is impregnated with a polyurethane matrix comprising 30% by weight of the polyethylene fabric. The non-woven polyethylene fabric and the nylon fabric are adhered to each other via an intermediate polyurethane scrim. On its other surface, the non-woven polyethylene fabric is adhered to layer of plain weave polyethylene fabric (375 denier SPECTRA® 1000 fibers; plain weave construction; pick count of 32×32 ends/inch; areal density=0.82 lb/ft$^2$; as per Example 1). The non-woven polyethylene fabric and the woven polyethylene fabric are also adhered to each other via an intermediate polyurethane scrim. A colored PU/PE dual layer film is laminated to the outermost surface of the woven SPECTRA® polyethylene fabric to provide the surface of the polyethylene fabric with a colored appearance.

While the present disclosure has been particularly shown and described with reference to preferred embodiments, it will be readily appreciated by those of ordinary skill in the art that various changes and modifications may be made without departing from the spirit and scope of the disclosure. It is intended that the claims be interpreted to cover the disclosed embodiment, those alternatives which have been discussed above and all equivalents thereto.

What is claimed is:

1. A multilayer composite comprising:
   a) an outer fibrous material layer having first and second surfaces, said outer fibrous material layer comprising one or more fibrous plies; each of said fibrous plies comprising a plurality of fibers; said first surface of the outer fibrous material layer having a colored appearance;
   b) a fibrous base layer adjoined with the outer fibrous material layer, said fibrous base layer having first and second surfaces, wherein said first surface of the fibrous base layer is positioned facing said second surface of the outer fibrous material layer; said base layer comprising one or more fibrous plies, each of said fibrous plies comprising a plurality of fibers having a tenacity of greater than 10 g/denier; wherein at least some of the fibers of said outer fibrous material layer are chemically different than at least some of the fibers of said fibrous base layer; and wherein the second surface of the fibrous base layer has a colored appearance; and
   c) a first intermediate layer and a second intermediate layer between the outer fibrous material layer and the fibrous base layer, wherein said first intermediate layer comprises a polyurethane scrim having first and second surfaces and said polyurethane scrim comprises a polyurethane net or a polyurethane mesh, and said second intermediate layer comprises a compatibilizing adhesive polymer layer having first and second surfaces, wherein said first intermediate layer and said second intermediate layer are bonded together, wherein the first surface of said polyurethane scrim is bonded to the second surface of the outer fibrous material layer and the second surface of the polyurethane scrim is in contact with the first surface of the adhesive polymer layer, and the second surface of the adhesive polymer layer is bonded to a first surface of the fibrous base layer, and wherein the composite has a peel strength between the outer fibrous material layer and the fibrous base layer of at least 1.5 lbs/inch.

2. The composite of claim 1 wherein the outer fibrous material layer comprises nylon fibers and the fibrous base layer comprises ultra-high molecular weight polyethylene fibers.

3. The composite of claim 2 wherein said polyethylene fibers have a tenacity of at least 27 g/denier.

4. The composite of claim 1 wherein the outer fibrous material layer comprises a woven nylon fabric, wherein the first surface of the outer fibrous material layer is coated with a durable water repellent, and wherein the polyurethane scrim has a thickness of from about 1µm to about 250 µm.

5. The composite of claim 1 wherein said compatibilizing adhesive polymer layer comprises a modified polyethylene film.

6. The composite of claim 1 wherein said compatibilizing adhesive polymer layer comprises a dual ply adhesive film.

7. The composite of claim 6 wherein said dual ply adhesive film comprises a first polymer ply and a second polymer ply, wherein the first polymer ply comprises a first polymer and the second polymer ply comprises a second polymer, wherein the first polymer and second polymer are different, wherein the first polymer ply and the second polymer ply are unified and at least partially fused together wherein polymer molecules from the first polymer ply are commingled with polymer molecules from the second polymer ply, said commingled molecules forming a molecular entanglement region at the interface of the two polymer plies.

8. The composite of claim 1 wherein the first surface of the outer fibrous material layer is coated with a water repellent.

9. The composite of claim 8 wherein the water repellent comprises a durable water repellent that comprises a fluoropolymer or a fluorine-modified polymer.

10. The composite of claim 1 wherein each of the fibrous plies of the outer fibrous material layer is woven and wherein each of the fibrous plies of the fibrous base layer is woven.

11. The composite of claim 2 wherein the colored appearance of the first surface of the outer fibrous material is provided by one or more outer colorants applied to the fibers of said outer fibrous material, wherein each of said outer colorants has an outer color value, and wherein the colored appearance of the second surface of the fibrous base material is provided by a colored polymeric film coated on the second surface of the fibrous base layer, wherein said colored polymeric film comprises one or more inner colorants, wherein each of said inner colorants has an inner color value, wherein each of said inner color values is the same as or darker than each outer color value of the outer fibrous material layer.

12. The composite of claim 1 wherein the fibrous base layer comprises fibrous base layer fibers, wherein said fibrous base layer fibers consist of ultra-high molecular weight polyethylene fibers, and wherein the polyurethane scrim has a thickness of from about 5 µm to about 150 µm.

13. The composite of claim 1 wherein said fibrous base layer is impregnated with a thermoplastic polymeric binder material, and wherein the polyurethane scrim has a thickness of from about 10 µm to about 100 µm.

14. The composite of claim 1 wherein the outer fibrous material layer comprises outer fibrous material layer fibers, wherein said outer fibrous material layer fibers consist of nylon fibers, and wherein the fibrous base layer comprises fibrous base layer fibers, wherein said fibrous base layer fibers consist of polyethylene fibers.

15. The multilayer composite of claim 1, wherein the colored appearance of the first surface of the outer fibrous material is a camouflage pattern; wherein the colored appearance of the fibrous base layer is provided by a colored film having a single color;
- wherein a pattern of shaped openings is cut into and completely through the composite, whereby any exposure of the second surface of the fibrous base layer through said perforations is camouflaged by the colored appearance of the first surface of the outer fibrous material layer,
- and wherein the fibrous base layer comprises fibrous base layer fibers, wherein said fibrous base layer fibers consist of ultra-high molecular weight polyethylene fibers.

* * * * *